(12) United States Patent
Noguchi et al.

(10) Patent No.: US 9,773,605 B2
(45) Date of Patent: Sep. 26, 2017

(54) MAGNETIC CORE AND COIL COMPONENT USING SAME

(71) Applicant: HITACHI METALS, LTD., Tokyo (JP)

(72) Inventors: Shin Noguchi, Osaka (JP); Kazunori Nishimura, Osaka (JP); Toshio Mihara, Osaka (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/111,202

(22) PCT Filed: Jan. 14, 2015

(86) PCT No.: PCT/JP2015/050758
§ 371 (c)(1),
(2) Date: Jul. 13, 2016

(87) PCT Pub. No.: WO2015/108059
PCT Pub. Date: Jul. 23, 2015

(65) Prior Publication Data
US 2016/0336104 A1 Nov. 17, 2016

(30) Foreign Application Priority Data
Jan. 14, 2014 (JP) .................. 2014-004180

(51) Int. Cl.
*H01F 27/28* (2006.01)
*H01F 27/255* (2006.01)
(Continued)

(52) U.S. Cl.
CPC .............. *H01F 27/255* (2013.01); *B22F 1/00* (2013.01); *B22F 1/0062* (2013.01); *B22F 1/02* (2013.01);
(Continued)

(58) Field of Classification Search
CPC ........................ H01F 5/00; H01F 27/00–27/30
(Continued)

(56) References Cited

U.S. PATENT DOCUMENTS

2005/0176885 A1* 8/2005 Sekiba ................ C08K 5/5425
524/863
2005/0181202 A1* 8/2005 Kaneko ................ B22F 1/0062
428/336
(Continued)

FOREIGN PATENT DOCUMENTS

CN    101849268 A    9/2010
EP    2219195 A1    8/2010
(Continued)

OTHER PUBLICATIONS

Japanese Office Action issued in corresponding Japanese Patent Application 2015-557844 issued Aug. 23, 2016.
(Continued)

*Primary Examiner* — Tuyen Nguyen
(74) *Attorney, Agent, or Firm* — Sughrue Mion, PLLC

(57) ABSTRACT

A magnetic core has a structure in which Fe-based soft magnetic alloy particles are connected via a grain boundary. The Fe-based soft magnetic alloy particles contain Al, Cr and Si. An oxide layer containing at least Fe, Al, Cr and Si is formed at the grain boundary that connects the neighboring Fe-based soft magnetic alloy particles. The oxide layer contains an amount of Al larger than that in Fe-based soft magnetic alloy particles, and includes a first region in which the ratio of Al is higher than the ratio of each of Fe, Cr and Si to the sum of Fe, Cr, Al and Si, and a second region in which the ratio of Fe is higher than the ratio of each of Al, Cr and Si to the sum of Fe, Cr, Al and Si. The first region is on the Fe-based soft magnetic alloy particle side.

5 Claims, 15 Drawing Sheets

(51) Int. Cl.

| | |
|---|---|
| *B22F 1/00* | (2006.01) |
| *B22F 1/02* | (2006.01) |
| *B22F 3/14* | (2006.01) |
| *C22C 33/02* | (2006.01) |
| *C22C 38/00* | (2006.01) |
| *C22C 38/06* | (2006.01) |
| *C22C 38/18* | (2006.01) |
| *C22C 45/02* | (2006.01) |
| *H01F 1/24* | (2006.01) |
| *H01F 41/02* | (2006.01) |
| *B22F 3/03* | (2006.01) |
| *B22F 3/04* | (2006.01) |
| *B22F 3/24* | (2006.01) |
| *B22F 9/04* | (2006.01) |
| *B22F 9/08* | (2006.01) |
| *C22C 38/02* | (2006.01) |
| *C22C 38/04* | (2006.01) |
| *C22C 38/08* | (2006.01) |
| *H01F 1/33* | (2006.01) |

(52) U.S. Cl.
CPC ............... *B22F 3/03* (2013.01); *B22F 3/04* (2013.01); *B22F 3/14* (2013.01); *B22F 3/24* (2013.01); *B22F 9/04* (2013.01); *B22F 9/082* (2013.01); *C22C 33/02* (2013.01); *C22C 33/0257* (2013.01); *C22C 33/0264* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/18* (2013.01); *C22C 45/02* (2013.01); *H01F 1/24* (2013.01); *H01F 27/28* (2013.01); *H01F 27/2823* (2013.01); *H01F 41/0246* (2013.01); *B22F 2003/248* (2013.01); *B22F 2009/0828* (2013.01); *B22F 2998/10* (2013.01); *H01F 1/33* (2013.01)

(58) Field of Classification Search
USPC ............... 336/65, 83, 212, 200, 232–234
See application file for complete search history.

(56) References Cited

U.S. PATENT DOCUMENTS

| | | |
|---|---|---|
| 2010/0323206 A1 | 12/2010 | Soma et al. |
| 2011/0267167 A1 | 11/2011 | Ogawa et al. |
| 2012/0082844 A1 | 4/2012 | Takahashi et al. |
| 2013/0154784 A1 | 6/2013 | Hachiya et al. |
| 2013/0200970 A1 | 8/2013 | Ogawa et al. |
| 2015/0332850 A1 | 11/2015 | Nishio et al. |
| 2017/0018343 A1* | 1/2017 | Nishimura .......... C22C 33/0257 |
| 2017/0025214 A1* | 1/2017 | Nishimura .......... C22C 33/0257 |

FOREIGN PATENT DOCUMENTS

| | | |
|---|---|---|
| JP | 57-114637 A | 7/1982 |
| JP | 2001-11563 A | 1/2001 |
| JP | 2005-220438 A | 8/2005 |
| JP | 2009-164402 A | 7/2009 |
| JP | 2009-206483 A | 9/2009 |
| JP | 2010-138438 A | 6/2010 |
| JP | 2011-249774 A | 12/2011 |
| JP | 2012-94804 A | 5/2012 |
| JP | 2013-125887 A | 6/2013 |
| JP | 2013-197394 A | 9/2013 |
| WO | 2014/112483 A1 | 7/2014 |

OTHER PUBLICATIONS

PCT/IB/338 with attached Preliminary Report on Patentability and Written Opinion (PCT/ISA/237), received in counterpart PCT/JP2015/050758.
International Search Report for PCT/JP2015/050758 dated Feb. 24, 2015.
Japanese Office Action issued in Japanese Patent Application No. 2015-557844 dated Jan. 10, 2017.
Japanese Office Action issued in corresponding Japanese Patent Application No. 2015-557844 dated Apr. 26, 2017.
Chinese Office Action issued in corresponding Foreign Patent Application No. 201580004538.2 dated Aug. 1, 2017.

* cited by examiner

Si 0.2Mass%、750°C  SEM  ×1000

Electron microscope image 1

(a) Si 0.2 Mass%、750℃ SEM ×5000

Iron Kα1

(b) Si 0.2 Mass%、750℃ SEM Fe MAP

Aluminum Kα1

(c) Si 0.2 Mass%、750℃ SEM Al MAP

Oxygen Kα1

(d) Si 0.2 Mass%、750℃ SEM O MAP

Si 0.2 Mass%、500℃  SEM  ×1000

Electron microscope image 1
(a) Si 0.2 Mass%, 500°C SEM

Iron Kα1
(b) Si 0.2 Mass%, 500°C SEM Fe MAP

Aluminum Kα1
(c) Si 0.2 Mass%, 500°C SEM Al MAP

Oxygen Kα1
(d) Si 0.2 Mass%, 500°C SEM O MAP

Si 0.2 Mass%, 900°C  SEM  ×1000

Electron microscope image 1
(a) Si 0.2 Mass%, 900℃ SEM

Iron Kα1
(b) Si 0.2 Mass%, 900℃ SEM Fe MAP

Aluminum Kα1
(c) Si 0.2 Mass%, 900℃ SEM Al MAP

Oxygen Kα1
(d) Si 0.2 Mass%, 900℃ SEM O MAP (a)

Si 0.2 Mass%, 750℃ TEM (b)

Si 0.2 Mass%, 750℃ TEM

Si 0.2 Mass%、900℃ TEM

Direct-current superimposing characteristic diagram

N2 Atmosphere   Si 0.2 Mass%、 750℃   SEM   ×1000

Electron microscope image 1

(a) N2 Atmosphere  Si 0.2Mass%、 750°C  SEM

Iron Kα1

(b) N2 Atmosphere  Si 0.2 Mass%、 750°C  SEM  Fe  MAP

Aluminum Kα1

(c) N2 Atmosphere  Si 0.2 Mass%、 750°C  SEM  Al  MAP

Oxygen Kα1

(d) N2 Atmosphere  Si 0.2 Mass%、 750°C  SEM  O  MAP

N2 Atmosphere  Si 0.2Mass%、750℃  TEM

Si 0.94Mass%  750℃  TEM

Discharge plasma sintering   SEM   ×1000

Coil component

MAGNETIC CORE AND COIL COMPONENT USING SAME

CROSS REFERENCE TO RELATED APPLICATIONS

This application is a National Stage of International Application No. PCT/JP2015/050758 filed Jan. 14, 2015, claiming priority based on Japanese Patent Application No. 2014-004180 filed Jan. 14, 2014, the contents of all of which are incorporated herein by reference in their entirety.

TECHNICAL FIELD

The present invention relates to a magnetic core formed by Fe-based soft magnetic alloy particles, and a coil component with a wire wound around the magnetic core.

BACKGROUND ART

Hitherto, coil components such as an inductor, a transformer, and a choke coil, have been used in various articles such as household electric appliances, industrial equipment, and vehicles. A coil component includes a magnetic core and a coil wound around the magnetic core. In this magnetic core, ferrite, which is excellent in magnetic property, shape flexibility and costs, has widely been used.

In recent years, a decrease in the size of power source devices of electronic instruments and others has been advancing, so that intense desires have been increased for coil components which are small in size and height, and are usable against a large current. As a result, the adoption of powder magnetic cores, in each of which a metallic magnetic powder is used, and which are higher in saturation magnetic flux density than ferrite, has been advancing. As metallic magnetic powders, for example, pure Fe particles, and Fe-based magnetic alloy particles such as those of Fe—Si-based, Fe—Al—Si-based and Fe—Cr—Si-based alloys are used.

The saturation magnetic flux density of a Fe-based magnetic alloy is, for example, 1 T or more, and a magnetic core using the Fe-based magnetic alloy has an excellent superimposing characteristic even when downsized. On the other hand, since such a magnetic core contains a large amount of Fe, and therefore easily gets rusty, and also has a low specific resistance and a large eddy current loss, the magnetic core is considered to be difficult to use in high-frequency applications with a frequency of more than 100 kHz unless the alloy particles are coated with an insulating material such as resin and glass. Accordingly, Fe-based magnetic alloy particles are bonded together via the insulating material, and therefore may be inferior in strength as compared to ferrite magnetic cores because the strength of the magnetic core is affected by the strength of the insulating material.

For improving the specific resistance and strength without subjecting alloy particles to an insulating treatment such as glass coating, Patent Document 1 discloses a magnetic core in which Fe—Si alloy powder particles containing 3.0 to 7.0% of Si and 0.02% or less of C with the balance being constituted by Fe are bonded together by an oxide mainly composed of Fe. In this document, Fe—Si alloy powder particles are formed into a compact, and the compact is held at 500° C. to 600° C. in heated water vapor, so that iron is reacted with the water vapor to form an oxide film which binds Fe—Si alloy powder particles together. The oxide film has a thick layer of $Fe_3O_4$ on the surface, and a layer of a mixture of $Fe_2O_3$, iron silicate and $SiO_2$ on the inside thereof. The oxide film is composed of a substance having a high specific resistance, so that the specific resistance of the magnetic core is increased, and the strength of the magnetic core is secured.

Patent Document 2 discloses a magnetic core produced in the following manner: an alloy powder having a surface oxide film of 100 nm or less and mainly composed of Fe, Al and Si is heat-treated in an oxidizing atmosphere to further form an oxide layer of alumina at a location where the surface oxide film is broken during pressing, so that insulation between alloy powders is secured to reduce the eddy current loss.

Patent Document 3 discloses a magnetic core produced in the following manner: a compact composed of a group of particles of a soft magnetic alloy containing Fe and Si, and Cr or Al, i.e. a metal element that is more oxidizable than Fe, is heat-treated at 400° C. to 900° C., and the particles are bonded together via an oxide layer formed by the heat treatment, so that the magnetic core has a specific resistance of $1\times10^{-3}$ Ω·cm ($1\times10^{-1}$ Ω·m) or more and a three-point rupture stress of 1.0 $kgf/mm^2$ (9.8 MPa) or more.

Patent Document 4 discloses a magnetic material produced in the following manner: a Fe—Cr—Al-based magnetic powder containing 1.0 to 30.0% by mass of Cr and 1.0 to 8.0% by mass of Al with the balance being substantially constituted by Fe is heat-treated in an oxidizing atmosphere at 800° C. or higher, so that an oxide film containing 20% by mass or more of alumina is self-generated on the surface, and further, the heat-treated powder is solidified and compacted by discharge plasma sintering in a vacuum chamber. The magnetic material is used in alternating magnetic fields in, for example, stators and rotators of motors.

PRIOR ART DOCUMENTS

Patent Documents

Patent Document 1: JP-A-S57-114637
Patent Document 2: JP-A-2001-11563
Patent Document 3: JP-A-2011-249774
Patent Document 4: JP-A-2005-220438

DISCLOSURE OF THE INVENTION

Problems to be Solved by the Invention

A magnetic core using a conventional metallic magnetic powder (soft magnetic alloy particles) has a higher saturation magnetic flux density as compared to a ferrite magnetic core, and therefore an excellent superimposing characteristic is obtained even when the magnetic core is downsized. However, the specific resistance of the magnetic core in Patent Document 1 is only about 160 μΩ·cm ($1.6\times10^{-6}$ Ω·m). If the magnetic core is in contact with air for a long period of time, alloy powder particles are oxidized to get rusty, and a rust-preventing treatment such as resin coating is required.

The magnetic core in Patent Document 2 is produced using an alloy powder having an oxide film (insulating layer) on the surface, but the document does not disclose what the oxide film is like and how the alloy powders are bonded. A portion where the oxide layers of alumina are bonded and connected (neck portion) may be quite limited, and it is presumed that an increase in strength of the magnetic core cannot be expected.

The magnetic core in Patent Document 3 has a strength comparable to that of a ferrite magnetic core with the rupture stress being less than 100 MPa although an excellent specific resistance of more than $1\times10^3$ Ω·m, which ensures that an electrode can be formed directly on the surface of the magnetic core, is obtained under the heat treatment conditions described in examples. When the heat treatment temperature is elevated to 1000° C., the rupture stress increases to 20 kgf/mm$^2$ (196 MPa), but the specific resistance outstandingly decreases to $2\times10^2$ Ω·cm (2 Ω·m). Thus, a high specific resistance and a strength greater than that of a ferrite magnetic core have not been obtained yet. Excellent rust-preventing performance in a salt water spray test is required, and the magnetic cores in Cited Document 2 and Cited Document 3 may be required to have further improved rust-preventing treatment.

Discharge plasma sintering used in the production method in Patent Document 4 requires complicated equipment and much treatment time. Moreover, the heat-treated magnetic powder is easily aggregated, and thus a grinding step is necessary, so that the process becomes complicated. Examples show that owing to the oxide film, the electric resistance increases by a factor of about 2.5, but the resistance value itself is only several mΩ irrespective of presence/absence of the oxide film, and is not satisfactory when the magnetic core is used in high-frequency applications and when an electrode is formed directly on the surface of the magnetic core.

Accordingly, an object of the present invention is to provide a magnetic core which is excellent in specific resistance, strength and rust prevention and which is easily compacted and heat-treated and is excellent in productivity; and a coil component using the magnetic core.

Means for Solving the Problems

The object can be achieved by the following present invention. The present invention provides a magnetic core having a structure in which Fe-based soft magnetic alloy particles are connected via a grain boundary, wherein the Fe-based soft magnetic alloy particle contains Al, Cr and Si, and an oxide layer containing at least Fe, Al, Cr and Si is formed at the grain boundary that connects the neighboring Fe-based soft magnetic alloy particles, the oxide layer contains an amount of Al larger than that in Fe-based soft magnetic alloy particles in terms of a mass ratio, and includes a first region in which the ratio of Al is higher than the ratio of each of Fe, Cr and Si to the sum of Fe, Cr, Al and Si, and a second region in which the ratio of Fe is higher than the ratio of each of Al, Cr and Si to the sum of Fe, Cr, Al and Si, and the first region is situated on the Fe-based soft magnetic alloy particle side.

In the magnetic core in accordance with the present invention, it is preferable that the grain boundary includes an area where the second region is sandwiched by the first region, or the second region is surrounded by the first region.

In the magnetic core in accordance with the present invention, it is preferable that the Fe-based soft magnetic alloy particle contains Al in an amount of not less than 3% by mass and not more than 10% by mass, Cr in an amount of not less than 3% by mass and not more than 10% by mass, and Si in an amount of not less than 0.05% by mass and not more than 1% by mass. Further, it is preferable that the space factor of the magnetic core is 80 to 90%.

Further, a coil component in accordance with the present invention is a coil component with a wire wound around the magnetic core mentioned above.

Effect of the Invention

According to the present invention, there can be provided a magnetic core which is excellent in specific resistance, strength and rust prevention and which is easily compacted and heat-treated and is excellent in productivity; and a coil component using the magnetic core.

BRIEF DESCRIPTION OF THE DRAWINGS

FIG. 4(*b*) is a mapping diagram showing a distribution of Fe in the cross-section of the magnetic core; FIG. 4(*c*) is a mapping diagram showing a distribution of Al in the cross-section of the magnetic core; and FIG. 4(*d*) is a mapping diagram showing a distribution of O in the cross-section of the magnetic core.

FIG. 6(*b*) is a mapping diagram showing a distribution of Fe in the cross-section of the magnetic core; FIG. 6(*c*) is a mapping diagram showing a distribution of Al in the cross-section of the magnetic core; and FIG. 6(*d*) is a mapping diagram showing a distribution of O in the cross-section of the magnetic core.

FIG. 8(*b*) is a mapping diagram showing a distribution of Fe in the cross-section of the magnetic core; FIG. 8(*c*) is a mapping diagram showing a distribution of Al in the cross-section of the magnetic core; and FIG. 8(*d*) is a mapping diagram showing a distribution of O in the cross-section of the magnetic core.

FIG. 9(*b*) shows a TEM photograph of the grain boundary in the cross-section of the magnetic core according to one example of the present invention (in the air, annealing temperature: 750° C.) in another field of view.

MODE FOR CARRYING OUT THE INVENTION

Figure 1:
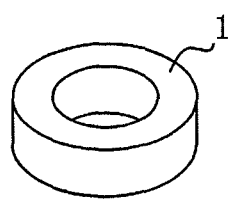
FIG. 1 is an outline view showing one embodiment of a magnetic core according to the present invention.
Figure 2:
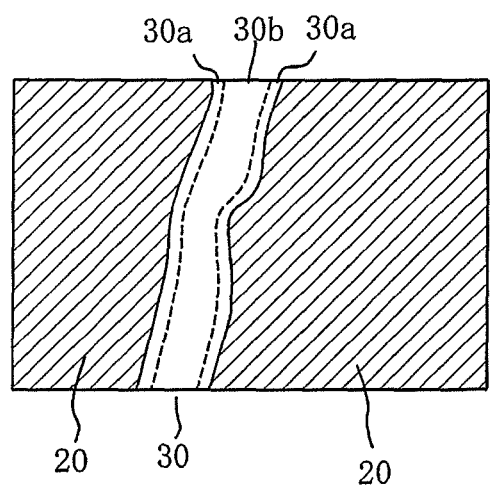
FIG. 2 is a schematic view showing one example of a structure of a magnetic core according to the present invention.

Hereinafter, embodiments of a magnetic core and a coil component according to the present invention will be described in detail, but the present invention is not limited thereto. FIG. 1 is an outline view showing one embodiment of a magnetic core according to the present invention. FIG. 2 is a schematic view for explaining a structure of a very small region including a grain boundary between two particles in Fe-based soft magnetic alloy particles of the magnetic core.

A magnetic core 1 has a structure in which Fe-based soft magnetic alloy particles 20 containing Al, Cr and Si are connected via a grain boundary. At the grain boundary that connects adjacent Fe-based soft magnetic alloy particles 20 to each other, an oxide layer 30 containing at least Fe, Al, Cr and Si is formed. The oxide layer 30 contains an amount of Al larger than that in Fe-based soft magnetic alloy particles 20 in terms of a mass ratio, and includes a first region 30a and a second region 30b as illustrated in FIG. 2. The first region 30a is a region in which the ratio of Al is higher than the ratio of each of Fe, Cr and Si to the sum of Fe, Cr, Al and Si. The second region 30b is a region in which the ratio of Fe is higher than the ratio of each of Al, Cr and Si to the sum of Fe, Cr, Al and Si.

Al, Cr and Si which are non-iron metals that form Fe-based soft magnetic alloy particles 20 have a higher affinity with O as compared to Fe. When Fe-based soft magnetic alloy particles 20 are compression-pressed into a predetermined shape, and the resulting compact is annealed at a predetermined temperature in an atmosphere including oxygen, oxides of the non-iron metals having a high affinity with O, and oxide of Fe are formed to cover the surfaces of Fe-based soft magnetic alloy particles 20, and fill gaps between particles. The formed oxide layer 30 contains an amount of Al larger than that in Fe-based soft magnetic alloy particles 20 in terms of a mass ratio. More detailed observation shows that the oxide layer 30 includes the first region 30a in which Al is enriched as compared to Fe, Cr and Si, and the second region 30b in which Fe is enriched as compared to the non-iron metals, and the oxide layer 30 can be formed so as to sandwich the second region 30b by the first region 30a or so as to surround the second region 30b by the first region 30a with the first region 30a situated on the Fe-based soft magnetic alloy particle 20 side. In the grain boundary shown in FIG. 2, the second region 30b is sandwiched by the first region 30a.

As described above, the oxide layer 30 is grown by reacting Fe-based soft magnetic alloy particles 20 with oxygen by a heat treatment, and formed by an oxidation reaction that is beyond self-oxidation of Fe-based soft magnetic alloy particles 20. In the example in FIG. 2, the first region 30a is formed on the side of the interface between Fe-based soft magnetic alloy particles 20 and the oxide layer 30, and the second region 30b is formed on the inside of the oxide layer 30 in a very small region including a grain boundary between two particles of the magnetic core 1. The first region 30a having a relatively high ratio of Al extends along the interface between Fe-based soft magnetic alloy particles 20 and the oxide layer 30, and is in contact with the interface. On the other hand, the second region 30b having a relatively high ratio of Fe is sandwiched by the first region 30a from both sides, is therefore away from the interface between Fe-based soft magnetic alloy particles 20 and the oxide layer 30, and is not in contact with the interface. Thus, the first region 30a is formed at the end part of the oxide layer 30 in the thickness direction, and the second region 30b is formed at the central part of the oxide layer 30 in the thickness direction. The periphery of the second region 30b may be surrounded by the first region 30a in a very small region including a grain boundary between two particles of the magnetic core 1 (not illustrated). It is desirable that the magnetic core as a whole have such a grain boundary structure, but there may be a part that is constituted only by the first region 30a, or there may be other forms.

Fe and non-Fe metals have a higher electric resistance in the form of an oxide than in the form of a metal alone. The oxide layer 30 containing Fe, Al, Cr and the like can be interposed between dispersed Fe-based soft magnetic alloy particles 20 to serve as an insulating layer between Fe-based soft magnetic alloy particles 20. Further, when Fe-based soft magnetic alloy particles 20 are bonded together via the specific oxide layer 30 having enriched Al or Fe, the specific resistance, magnetic core strength and rust prevention are improved. The specific resistance is preferably $1 \times 10^3$ Ω·cm or more. The radial crushing strength is preferably 100 MPa or more, further preferably 120 Mpa or more. Fe-based soft magnetic alloy particles 20 may be partially connected to one another within the bounds of satisfying characteristics required for the magnetic core.

A Fe-based soft magnetic alloy which is used in the Fe-based soft magnetic alloy particle 20 and contains Al, Cr and Si has Fe as a main component, the content of which is the highest among components that form the soft magnetic alloy, and contains Al, Cr and Si as sub-components. Si may be contained in the Fe-based soft magnetic alloy particle 20 as an unavoidable impurity. The Fe-based soft magnetic alloy particles 20 may contain C, Mn, P, S, O, Ni, N and the like as other unavoidable impurities. In other words, the Fe-based soft magnetic alloy particle 20 may be one that contains Al, Cr and Si with the balance being constituted by Fe and unavoidable impurities.

Fe is a main element that forms the Fe-based soft magnetic alloy particle, and influences magnetic characteristics such as saturation magnetic flux density and mechanical characteristics such as strength of the Fe-based soft magnetic alloy. Depending on a balance with other non-iron metals, the Fe-based soft magnetic alloy particle contains Fe preferably in an amount of 80% by mass or more, so that a soft magnetic alloy having a high saturation magnetic flux density can be obtained.

Preferably, the Fe-based soft magnetic alloy particle contains Al in an amount of not less than 3% by mass and not more than 10% by mass. Al has a higher affinity with O as compared to Fe and other non-iron metals. Accordingly, O in the air, and O contained in an organic substance called a binder as described later are preferentially bonded to Al in the vicinity of the surface of the Fe-based soft magnetic alloy particle to generate chemically stable $Al_2O_3$, composite oxides with other non-iron metals and the like on the surface of the Fe-based soft magnetic alloy particle as oxides containing Al. O that is about infiltrate into the Fe-based soft magnetic alloy particle reacts with Al to successively generate oxides containing Al, and therefore infiltration of O into the Fe-based soft magnetic alloy particle is prevented to suppress an increase in concentration of an impurity (O), so that deterioration of the magnetic characteristics of the Fe-based soft magnetic alloy can be prevented. An oxides containing Al is excellent in corrosion resistance and stability, and therefore when a layer of an oxide of Al is formed on the surface of the Fe-based soft magnetic alloy particle, insulation between the particles can be improved to reduce the eddy current loss of the magnetic core. Further, since the alloy contains Al, the specific resistance of the alloy itself increases. When the composition amount of Al is less than 3% by mass, the capability of forming an oxide by Al may be insufficient, so that insulation between the particles and the rust-preventing effect may be deteriorated. On the other hand, when the composition amount of Al is more than 10% by mass, the amount of Fe may be decreased to reduce the saturation magnetic flux density and the initial permeability, or increase the coercive force, and thus it may be unable to obtain desired magnetic characteristics.

Preferably, the Fe-based soft magnetic alloy particle contains Cr in an amount of not less than 3% by mass and not more than 10% by mass. The affinity of Cr with O is the second highest after that of Al, and similarly to Al, Cr is bonded to oxygen to generate chemically stable $Cr_2O_3$, composite oxides with other non-iron metals, and so on. On the other hand, since Al preferentially forms an oxide, the amount of Cr in the formed oxide is apt to be smaller than the amount of Al. An oxide containing Cr is excellent in corrosion resistance and stability, so that insulation between the particles can be improved to reduce the eddy current loss of the magnetic core. When the composition amount of Cr is less than 3% by mass, oxide formation may be insufficient, so that insulation between the particles and the rust-preventing effect may be deteriorated. On the other hand, when the composition amount of Cr is more than 10% by mass, the amount of Fe may be decreased to reduce the saturation magnetic flux density and the initial permeability, or increase the coercive force, and thus it may be unable to obtain desired magnetic characteristics.

In a general step of refining a Fe-based alloy, Si is normally used as a deoxidizer for removing oxygen O as an impurity. Added Si is separated as an oxide, and removed during the refining step, but partially remains, and is often contained in the alloy as an unavoidable impurity in an amount of up to about 0.5% by mass. Depending on a raw material used, Si may be contained in the alloy in an amount of up to about 1% by mass. A raw material having a high purity can be provided, and refined by vacuum melting, but reduction of the amount of Si to less than 0.05% by mass leads to poor mass productivity, and is not preferable from the viewpoint of costs. Accordingly, in the present invention, the amount of Si is preferably 0.05% by mass to 1% by mass. The range of the amount of Si is a range not only when Si exists as an unavoidable impurity (typically 0.5% by mass or less) but also when a small amount of Si is added. When the amount of Si is in this range, the initial permeability can be improved while a high specific resistance and a high radial crushing strength are achieved, and also the magnetic core loss can be reduced. The initial permeability is preferably 40 or more, and the magnetic core loss Pcv is preferably 750 kW/m³ or less (excitation magnetic flux density: 30 mT, frequency: 300 kHz).

Preferably, the contents of other unavoidable impurities in the Fe-based soft magnetic alloy particle are as follows: Mn≤1% by mass, C≤0.05% by mass, O≤0.5% by mass, Ni≤0.5% by mass, N≤0.1% by mass, P≤0.02% by mass and S≤0.02% by mass.

The method for preparing alloy particles from a Fe-based soft magnetic alloy having a composition as described above is preferably an atomization method (water atomization method, gas atomization method or the like) capable of efficiently preparing fine particles having an average particle size of 1 to 100 μm in terms of a median diameter d50 in a cumulative particle size distribution, especially preferably a water atomization method with which particles having a small size are easily obtained. Since the average particle size is small, the strength of the magnetic core is improved, and the eddy current loss is reduced to improve the magnetic core loss. The median diameter d50 is more preferably 30 μm or less, further preferably 20 μm or less. On the other hand, when the average particle size is small, the permeability easily decreases, and therefore the median diameter d50 is preferably 5 μm or more.

In the water atomization method, an elemental raw material weighed so as to give a predetermined alloy composition is melted in a high-frequency heating furnace, or an alloy ingot prepared beforehand so as to give an alloy composition is melted in a high-frequency heating furnace to obtain a molted metal (hereinafter, referred to as a "molten metal"), and the molten metal is collided against water ejected at a high speed and a high pressure, whereby fine particles are formed and cooled to obtain Fe-based soft magnetic alloy particles.

On the surface of the soft magnetic alloy particle obtained by the water atomization method (hereinafter, sometimes referred to as a "water atomization powder"), a natural oxide film containing $Al_2O_3$ as an oxide of Al is formed in an island form or a film form with a thickness of about 5 to 20 nm. The island form refers to a state in which the surface of the alloy particle is interspersed with an oxide of Al. The natural oxide film may contain an oxide of Fe (hereinafter, sometimes described as "Fe—O").

When a natural oxide film is formed on the surface of the alloy particle, a rust-preventing effect is obtained, and therefore unnecessary oxidation can be prevented until the Fe-based soft magnetic alloy is heat-treated. Fe-based soft magnetic alloy particles can be stored in the air. On the other hand, when the thickness of the oxide film increases, the soft magnetic alloy particles may be hardened to hinder compactability. For example, the water atomization powder immediately after water atomization is wetted with water, and when the water atomization powder is required to be dried, the drying temperature (e.g. temperature in a drying furnace) is preferably 150° C. or lower.

The particle sizes of the obtained Fe-based soft magnetic alloy particles have a distribution, and when a die is filled with the particles, particles having a large particle size easily form a large gap between particles, so that the filling rate does not increase, and thus the compact density in powder pressing tends to be decreased. Accordingly, it is preferable that the obtained Fe-based soft magnetic alloy particles are classified, and particles having a large particle size are removed. Preferably, sieving classification is carried out as a classification method.

Preferably, Fe-based soft magnetic alloy particles are formed into granules by performing granulation with a plurality of particles bound by an organic binder. By using granules obtained by performing granulation, fluidity and filling property in a die during pressing can be improved. The organic binder binds granules in pressing, and imparts a strength to a compact so that the compact can endure handling and processing after pressing. The kind of the binder is not particularly limited, and for example, various kinds of organic binders such as polyethylene, polyvinyl alcohol and acrylic resin may be used. The added amount of the binder may be such an amount that the binder can sufficiently spread all over the Fe-based soft magnetic alloy particles to obtain a sufficient compact strength, but when the added amount of the binder is excessively large, the density and strength tend to be reduced. For example, the added amount of the binder is preferably 0.2 to 10 parts by weight based on 100 parts by weight of the Fe-based soft magnetic alloy particles.

As a granulation method, for example, a wet granulation method such as rolling granulation or spray drying granulation may be employed. Particularly, spray drying granulation using a spray dryer is preferable, and according to this method, the form of the resulting granules is close to a spherical shape, the time of exposure to heated air is short, and a large amount of granules can be obtained. Preferably, the resulting granules have a bulk density of 1.5 to 2.5 g/cc and an average granule size (d50) of 60 to 150 µm. The thus-formed granules composed of Fe-based soft magnetic alloy particles are excellent in fluidity during pressing, and gaps are hard to be generated between particles, so that filling property into a die is enhanced to increase the density of the compact, and thus a magnetic core having a high permeability is obtained. In spray drying granulation using a spray dryer, it is preferable that control is performed while the upper limit of the pH of a slurry as described later is set to 9.0 so that the oxide film before annealing is not ruptured.

Preferably, a rubricating material such as stearic acid or a stearic acid salt is added for reducing friction between the powder and the die during pressing. The added amount of the lubricating material is preferably 0.1 to 2.0 parts by weight based on 100 parts by weight of the Fe-based soft magnetic alloy particles.

The granules are pressed into a predetermined shape using a die. The Fe-based soft magnetic alloy particles after pressing come into point contact or surface contact with one another with a binder or a natural oxide film interposed between the particles, and neighbor one another partially with gaps between the particles. For powder pressing, a press machine such as a hydraulic press or a servo press is used. The fluidity of granules in the die can be improved by selection of the shape of soft magnetic alloy particles, the shape of granules and the average particle sizes thereof, and the effects of the binder and the lubricating material. The Fe-based soft magnetic alloy particles can exhibit a sufficiently high compact density and a radial crushing strength in a compact even when pressing is performed at a low pressure of 1 GPa or less. When pressing is performed at such a low pressure, rupture of the Al-containing natural oxide film formed on the surfaces of the Fe-based soft magnetic alloy particles can be reduced, so that the compact is harder to get rusty. The compact density is preferably $5.7 \times 10^3$ kg/m$^3$ or more, more preferably $5.95 \times 10^3$ kg/m$^3$ or more, and according to these Fe-based soft magnetic alloy particles, a satisfactory compact density can be easily achieved even in pressing at a low pressure. The radial crushing strength in the compact is preferably 3 MPa or more. Pressing may be performed at room temperature, or depending on a material of the binder, pressing may be carried out with granules heated to a temperature close to a glass transition temperature at which the binder is softened without eliminating the binder.

The resulting compact is heat-treated (annealed) for obtaining satisfactory magnetic characteristics by relaxing a stress distortion introduced during powder pressing. In the annealing, the binder is eliminated, and the oxide layer 30 is formed. The oxide layer 30 covers the surfaces of Fe-based soft magnetic alloy particles 20 and connects neighboring Fe-based soft magnetic alloy particles to each other.

Annealing can be performed in the air, or in an atmosphere where oxygen exists, such as a mixed gas of oxygen and an inert gas. Annealing can also be performed in an atmosphere where water vapor exists, such as a mixed gas of water vapor and an inert gas, but among them, the heat treatment in the air is simple and preferable.

The space factor in the heat-treated magnetic core is preferably in the range of 80 to 90%, more preferably 82 to 90%. Accordingly, the space factor can be increased to improve magnetic characteristics while equipment and cost-related burdens are reduced.

Observation of a cross-section of the magnetic core and examination of the distribution of constituent elements by use of a scanning electron microscope (SEM/EDX: Scanning Electron Microscope/energy dispersive X-ray spectroscopy) after annealing show that Al is enriched in the oxide layer 30 formed at the grain boundary between Fe-based soft magnetic alloy particles. When the cross-section of the magnetic core is observed with a transmission electron microscope (TEM: transmission electron microscope), it is found that the oxide layer 30 may have a layer configuration with a multilayer layered structure as shown in FIG. 2, or the layer configuration may not be clearly observed. Further detailed composition analysis (TEM-EDX: transmission electron microscope energy dispersive X-ray spectroscopy) shows that an oxide layer formed by heat treatment contains Fe, Al, Cr and Si. Moreover, in the vicinity of Fe-based soft magnetic alloy particles, the ratio of Al is higher than the ratio of each of Fe, Cr and Si to the sum of Fe, Cr, Al and Si (this region corresponds to the "first region"). However, a middle part between two particles in Fe-based soft magnetic alloy particles, and a region surrounded by Fe-based soft magnetic alloy particles (triple-point part) have a portion in which the ratio of Fe is higher than the ratio of each of Al, Cr and Si to the sum of Fe, Cr, Al and Si (this region corresponds to the "second region"). The space between Fe-based soft magnetic alloy particles at the triple-point part is greater than the space between two particles, and there the second region exists over a wide range, and gaps may exist.

Preferably, the annealing temperature is set to a temperature which ensures that the temperature of the compact is 600° C. or higher for forming the oxide layer while relaxing the stress distortion of the compact. When the annealing temperature is lower than 600° C., it may be unable to obtain a desired strength and specific resistance due to insufficient removal of a stress distortion and insufficient formation of an oxide layer. On the other hand, when the annealing temperature is higher than 850° C., an adverse effect may occur such that insulation is deteriorated due to partial elimination, degeneration or the like of the oxide layer, sintering considerably proceeds to cause Fe-based soft magnetic alloy particles to come into direct contact with one another, and the number of portions where these particles are partially connected (neck portions) increases to reduce the specific resistance, leading to an increase in eddy current loss in the magnetic core. Formation of neck portions in some parts is acceptable as long as a desired specific resistance and magnetic core loss are obtained. From these points, the annealing temperature is preferably 650 to 830° C. The holding time of the annealing temperature is appropriately set according to the size of the magnetic core, the throughput and the allowable range of variations in characteristics, and is preferably 0.5 to 3 hours.

The average thickness of the oxide layer between two particles after annealing is preferably 100 nm or less. The average thickness of the oxide layer is a thickness determined in the following manner: a cross-section of a magnetic core is observed at a magnification of 600,000 or more in a transmission electron microscope (TEM), the thickness at a part where the distance between Fe-based soft magnetic alloy particles is the smallest (minimum thickness) and the thickness at a part where the distance between Fe-based soft magnetic alloy particles is the largest (maximum thickness) are measured in an area where the outlines of the cross-sections of the Fe-based soft magnetic alloy particles within the observation field of view can be observed, and the arithmetic average of these thicknesses is calculated. When the oxide layer has a large thickness, the space between Fe-based soft magnetic alloy particles may be widened to cause a decrease in permeability and an increase in hysteresis loss, and the ratio of an oxide layer containing a nonmagnetic oxide may increase to reduce the saturation magnetic flux density. On the other hand, when the oxide layer has a small thickness, the eddy current loss may be increased by a tunnel current passing through the oxide layer, and therefore the average thickness of the oxide layer is preferably 10 nm or more. The average thickness of the oxide layer is more preferably 30 to 80 nm.

The abundance ratio of Fe-based soft magnetic alloy particles having a maximum diameter of 40 μm or more in a cross-section observation image of the magnetic core by SEM at a magnification of 1,000 is preferably 1% or less. The abundance ratio is determined by measuring the total number K1 of alloy particles surrounded by grain boundaries in all directions in the observation field of view and the number K2 of alloy particles having a maximum diameter of 40 μm or more among the total number of alloy particles, dividing K2 by K1, and expressing the obtained value as a percentage. The measurement of K1 and K2 is performed for alloy particles having a maximum diameter of 1 μm or more. When Fe-based soft magnetic alloy particles that form the magnetic core are made fine, high-frequency characteristics are improved.

Since the oxide layer formed by annealing is self-generated from Fe-based soft alloy particles, the size of the alloy particles becomes smaller than that before annealing. Further, since the oxide layer is formed so as to fill gaps between alloy particles, the magnetic core after annealing is slightly shrunk as compared to the compact.

A coil component is obtained by winding a wire around a magnetic core as described above. In other words, the coil component can be formed from the magnetic core and a coil with a conductor wound around the magnetic core. The coil may be formed by directly winding a conductor around the magnetic core, or may be formed by winding a conductor around a bobbin composed of a heat-resistant resin. The coil component is used as, for example, a choke, an inductor, a reactor, a transformer and so on. An electrode for connecting the end part of the coil may be formed on the surface of the magnetic core by a method such as plating or baking.

EXAMPLES

Examples of the present invention will now be described in detail.

(1) Preparation of Fe-Based Soft Magnetic Alloy Particles

First, an ingot was prepared using elemental raw materials of Fe, Al, Cr and Si each having a purity of more than 99.9%. In this example, high-purity raw materials were intentionally used for controlling the impurity level of Si. The prepared ingot was melted in a high-frequency induction furnace, and powdered by a water atomization method to obtain Fe-based soft magnetic alloy particles. The contents of C, Mn, P and S as impurities contained in the ingot were determined, and the result showed that they were each less than 0.05% by mass. Natural oxide films formed on the surfaces of the alloy particles were identified by Auger electron spectroscopy (JAMP-7830F manufactured by JEOL Ltd.). The results are shown in Table 1. Table 1 also shows the results of composition analysis of Fe-based soft magnetic alloy particles. The analysis values were values determined by an ICP emission spectrometric analysis method for Al, a volumetric method for Cr, and an absorptiometric method for Si.

The average particle size (median diameter d50) of the Fe-based soft magnetic alloy particles was determined by a laser diffraction/scattering particle size distribution measuring apparatus (LA-920 manufactured by HORIBA, Ltd.). Alloy No. 9 had an alloy composition identical to that of alloy No. 1, and was subjected to a heat treatment in which alloy particles were held at 900° C. for 1 hour in the air.

TABLE 1

| Alloy No. | Composition amount (% by mass) | | | | Average particle size d50 (μm) | Surface oxide film |
|---|---|---|---|---|---|---|
| | Fe | Al | Cr | Si | | |
| 1 | bal. | 4.92 | 3.89 | 0.20 | 9.8 | Al$_2$O$_3$ Fe—O Si—O |
| 2 | bal. | 4.92 | 3.94 | 0.11 | 13.8 | Not-evaluated |
| 3 | bal. | 4.90 | 3.94 | 0.30 | 16.9 | Not-evaluated |
| 4 | bal. | 4.96 | 3.89 | 0.47 | 11.8 | Not-evaluated |
| 5 | bal. | 4.93 | 3.89 | 0.53 | 12.3 | Not-evaluated |
| 6 | bal. | 4.87 | 4.04 | 0.94 | 12.4 | Not-evaluated |
| 7 | bal. | 4.96 | 7.91 | 0.20 | 14.4 | Not-evaluated |
| 8 | bal. | 7.95 | 3.95 | 0.20 | 12.9 | Not-evaluated |
| 9 | bal. | 4.92 | 3.89 | 0.20 | 9.8 | Al$_2$O$_3$ Fe—O Si—O 900° C. (1 Hr.) |

It was found that the natural oxide films formed on the surfaces of the Fe-based soft magnetic alloy particles included principally Al$_2$O$_3$, and also included Fe—O and Si oxide (hereinafter, sometimes described as "SiO").

The obtained Fe-based soft magnetic alloy particles were dried at 120° C. for 1 hour using a drying furnace. Next, the obtained Fe-based soft magnetic alloy particles were classified by a sieve of 440 mesh (aperture: 32 μm), and Fe-based soft magnetic alloy particles passing through the sieve were obtained.

(2) Granulation

Granulation was performed in two ways.

A. Granulation Method 1

In a stirring grinder, 2.5 parts by weight of PVA (POVAL PVA-205 manufactured by KURARAY CO., Ltd.; solid content: 10%) as a binder was added to and mixed with 100 parts by weight of Fe-based soft magnetic alloy particles. After mixing, the mixture was dried at 120° C. for 10 hours, and the mixed powder after drying was made to pass through a sieve to obtain a granules. The average particle size d50 of the granules after passing through the sieve was in the range of 60 to 80 μm.

B. Granulation Method 2

Soft magnetic alloy particles, PVA (POVAL PVA-205 manufactured by KURARAY CO., LTD; solid content: 10%) as a binder, and ion-exchanged water as a solvent were added in a vessel in a stirring apparatus, and stirred and mixed to obtain a slurry. The slurry concentration was 80% by mass. The amount of the binder was 7.5 parts by weight based on 100 parts by weight of the soft magnetic alloy particles. The slurry was sprayed in the apparatus by a spray dryer, the slurry was instantly dried with hot air adjusted to a temperature of 240° C., and particulate granules were collected from the lower part of the apparatus. The granules were made to pass through a sieve of 60 mesh (aperture: 250 μm) for removing coarse particles in the obtained granules. The average particle size of the granules after passing through the sieve was in the range of 60 to 80 μm as in granulation method 1. The average particle size of the granules was determined from a particle size distribution measured by a sieving method.

0.4 parts by weight of zinc stearate was added, respectively, to 100 parts by weight of the granules obtained by each of the granulation methods, and the mixture was mixed by a vessel rotary swinging powder mixer to obtain granules for pressing.

(3) Pressing

The obtained granules were fed into a die, and pressed at room temperature using a hydraulic press machine. The pressure was 0.74 GPa. The obtained compact is a toroidal ring having an inner diameter of 7.8 mm, an outer diameter of 13.5 mm and a thickness of 4.3 mm. The magnetic core is not limited to a simple shape such as a ring, and magnetic cores of various shapes can be formed. The dimensions of the above-mentioned compact are representative dimensions, and vary depending on a powder feeding rate, a pressure variation, properties of granules and so on.

(4) Annealing (Heat Treatment)

The ring compact was placed in an electric furnace, heated to an annealing temperature of 500 to 900° C. from room temperature at a temperature elevation rate of 2° C./min, and held at the annealing temperature for 1 to 4 hours, and the furnace was then cooled to obtain a magnetic core. Further, the magnetic core was annealed under a plurality of atmospheric conditions with different oxygen partial pressures. In the course of the heat treatment, a degreasing step of holding the magnetic core at 450° C. for 1 hour was carried out to decompose an organic substance such as a binder added during granulation and prevent remaining of carbon. The obtained magnetic core had representative dimensions of an inner diameter of 7.7 mm, an outer diameter of 13.4 mm and a thickness of 4.3 mm.

(5) Evaluation of Mechanical Characteristics, Magnetic Characteristics and Electrical Characteristics Various kinds of characteristics of the compact and the magnetic core were evaluated. Evaluation methods are shown below.

A. Density (Compact Density Dg, Density after Annealing ds)

The densities (kg/m$^3$) of the prepared toroidal ring compact and magnetic core were calculated from their dimensions and masses by a volume-weight method, and defined as a compact density dg and a density after annealing ds, respectively.

B. Space Factor Pf (Relative Density)

The calculated density after annealing ds was divided by the true density of the soft magnetic alloy to calculate the space factor (relative density) [%] of the magnetic core.

C. Specific Resistance ρ

A disc-shaped magnetic core was provided as a measurement object, a conductive adhesive was applied to two opposite flat surfaces of the magnetic core, and dried and solidified, and the measurement object was set between electrodes. Using an electric resistance measuring apparatus (8340A manufactured by ADC CORPORATION), a direct-current voltage of 50 V was applied, and the resistance value R (Ω) was measured. The area A (m$^2$) of the flat surface of the measurement object and the thickness t (m) of the measurement object were measured, and the specific resistance ρ (Ω·m) was calculated from the following equation.

$$\text{Specific resistance } \rho(\Omega \cdot m) = R \times (A/t)$$

The magnetic core has representative dimensions of an outer diameter of 13.5 mm and a thickness of 4 mm.

D. Radial Crushing Strength σr

In accordance with JIS Z2507, a ring magnetic core was provided as a measurement object, the measurement object was placed between surface plates in a tension/compression testing machine (Autograph AG-1 manufactured by Shimadzu Corporation) in such a manner that the loading direction coincided with the radial direction, a load was applied in the radial direction of the ring magnetic core, the maximum weight P (N) at breakage was measured, and the radial crushing strength σr (MPa) was calculated from the following equation.

$$\text{Radial crushing strength } \sigma r \text{ (MPa)} = P \times (D-d)/(I \times d^2)$$

[D: outer diameter of magnetic core (mm), d: thickness of magnetic core [½ of difference between inner and outer diameters] (mm), I: height of magnetic core (mm)]

E. Magnetic Core Loss Pcv

A ring magnetic core was provided as a measurement object, a primary wire and a secondary wire were each wound around the magnetic core by 15 turns, and the magnetic core loss Pcv (kW/m$^3$) was measured at room temperature under the condition of a maximum magnetic flux density of 30 mT and a frequency of 50 kHz to 500 kHz by B-H Analyzer SY-8232 manufactured by IWATSU TEST INSTRUMENTS CORPORATION.

F. Initial Permeability μi

A ring magnetic core was provided as a measurement object, a conductor was wound around the magnetic core by 30 turns, the inductance was measured at room temperature at a frequency of 100 kHz by a LCR meter (4284A manufactured by Agilent Technologies, Inc.), and the initial permeability μi was determined from the inductance in accordance with the following equation.

$$\text{Initial permeability } \mu i = (le \times L)/(\mu_0 \times Ae \times N^2)$$

(le: magnetic path length, L: inductance of sample (H), $\mu_0$: vacuum permeability=$4 \times 10^{-7}$ (H/m), Ae: cross-sectional area of magnetic core, N: number of turns of coil)

G. Incremental Permeability $\mu_A$ and Direct-Current Superimposing Characteristic A ring magnetic core was provided as a measurement object, a conductor was wound around the magnetic core by 30 turns to obtain a coil component, the inductance L was measured at room temperature at a frequency of 100 kHz by a LCR meter (4284A manufactured by Agilent Technologies, Inc.) while a direct-current magnetic field of up to 20000 A/m was applied using a direct-current applying apparatus (42841A manufactured by Hewlett-Packard Company). The incremental permeability $\mu_A$ was determined in the same manner as in the case of the initial permeability $\mu i$ from the obtained inductance.

H. Thickness, Configuration, Composition and Crystal Structure of Oxide Layer

A cross-section of the magnetic core was observed at a magnification of 600,000 or more by a transmission electron microscope (TEM), the minimum thickness and the maximum thickness between two Fe-based soft magnetic alloy particles were measured in an area where the outlines of the cross-sections of the Fe-based soft magnetic alloy particles within the observation field of view were observed, and from the arithmetic average of these thicknesses, the average thickness of the oxide layer was determined. Since the average thickness of the oxide layer varies depending on a measurement point, it is preferable to perform the measurement near the middle part between triplet points at grain boundaries. Distributions of constituent elements in the oxide layer were examined using a scanning electron microscope (SEM/EDX), and the composition was examined quantitative analysis of the composition using TEM/EDX. Further, the crystal structure was identified by nanobeam diffraction (NBD).

I. Abundance Ratio of Fe-Based Soft Magnetic Alloy Particles Having Maximum Diameter of 40 μm or More, and Average of Maximum Diameters In a cross-section observation image of the magnetic core by SEM at a magnification of 1,000, the total number K1 of alloy particles surrounded by grain boundaries in all directions in the observation field of view and the number K2 of alloy particles having a maximum diameter of 40 μm or more among the total number of alloy particles were measured, K2 was divided by K1, and the obtained value was expressed as a percentage to determine an abundance ratio. The shapes of the alloy particles are indeterminate, and some of the alloy particles have a distorted shape due to deformation during pressing. In cross-section observation, most particles are exposed at the cross-section of a part other than the center, and therefore it is difficult to obtain an accurate particle size. Thus, in one alloy particle, the length of the longest of straight lines connecting two points on the contour of the alloy particle is defined as the maximum diameter of the alloy particle. When a plurality of particles was connected to form a neck portion during annealing, the plurality of connected alloy particles was regarded as one alloy particle. The maximum diameters of alloy particles existing in the observation field of view were read, and the number average of the top 20 maximum diameters of alloy particles was calculated, and defined as an average of maximum diameters.

J. Evaluation of Rust Prevention

In accordance with JIS Z2371 (2000), the magnetic core was exposed to a 5% aqueous NaCl solution at 35° C. for 24 hours to conduct a salt water spray test.

Working Examples 1 to 4 and Comparative Examples 1 and 2

Magnetic cores were prepared with the annealing temperature changed between 500° C. and 900° C. For the magnetic cores, Fe-based soft magnetic alloy particles of alloy No. 1 (Fe-4.92Al-3.89Cr-0.20Si) in Table 1 were used. Alloy particles were formed by the granulation method 1, then filled into a die, and pressed at a pressure of 0.74 GPa. The radial crushing strength of the compact was 11 to 16 MPa, and a strength of 10 MPa or more was achieved. Further, the compact was heat-treated in the air at an annealing temperature of 500 to 900° C. with a holding time of 1 hour to obtain a magnetic core. The characteristics, such as the specific resistance and the radial crushing strength, of the obtained magnetic core were evaluated, and structure observation, and composition analysis of the oxide layer were performed by SEM and TEM. The results are shown in Tables 2 to 4 and FIGS. 3 to 10.

TABLE 2

| | Annealing temperature (° C.) | Compact density $dg \times 10^3$ (kg/m$^3$) | Density after annealing $dg \times 10^3$ (kg/m$^3$) | Space factor (%) | Specific resistance $\times 10^3$ $\Omega \cdot$ m at 50 V | Radial crushing strength (MPa) |
|---|---|---|---|---|---|---|
| Comparative Example 1 | 500 | 6.08 | 6.14 | 84.4 | 0.67 | 116 |
| Working Example 1 | 600 | 6.04 | 6.14 | 84.5 | 9.9 | 151 |
| Working Example 2 | 650 | 6.04 | 6.18 | 85.0 | 8.1 | 200 |
| Working Example 3 | 750 | 6.07 | 6.36 | 87.4 | 11.0 | 287 |
| Working Example 4 | 800 | 6.07 | 6.44 | 88.6 | 10.0 | 307 |
| Comparative Example 2 | 900 | 6.06 | 6.41 | 88.2 | Short-circuit | 442 |

TABLE 3

| | Magnetic core loss (kW/m³) | | | Initial permeability μi | Incremental permeability μ_A | Abundance ratio of alloy particles having maximum diameter of 40 μm or more (%) | Average of maximum diameters (μm) | Average thickness of oxide layer (nm) |
|---|---|---|---|---|---|---|---|---|
| | 50 kHz | 300 kHz | 500 kHz | | | | | |
| Comparative Example 1 | 81 | 460 | 797 | 37.0 | 23.4 | 0 | 16 | Not-evaluated |
| Working Example 1 | 82 | 516 | 885 | 51.1 | 23.0 | 0 | 16 | 38.0 |
| Working Example 2 | 82 | 551 | 948 | 52.3 | 22.6 | 0 | 19 | Not-evaluated |
| Working Example 3 | 69 | 478 | 830 | 56.7 | 22.9 | 0 | 17 | 60.0 |
| Working Example 4 | 70 | 463 | 815 | 54.9 | 21.9 | 0 | 17 | Not-evaluated |
| Comparative Example 2 | 3017 | — | — | 12.1 | 8.4 | 0 | 17 | 116.5 |

The magnetic cores of Working Examples 1 to 4 are magnetic cores obtained by annealing a compact at 600 to 800° C. in the air, the compact being formed from alloy particles of a Fe-based soft magnetic alloy having a composition of Fe-4.92Al-3.89Cr-0.20Si (% by mass). The magnetic cores of Comparative Examples 1 and 2 are magnetic cores obtained by annealing a compact at 500° C. and 900° C., respectively, in the air. The radial crushing strength monotonously increases with the annealing temperature. The specific resistance was kept high at an annealing temperature of 600 to 800° C., but rapidly decreased at an annealing temperature of 900° C. The magnetic core loss was 750 kW/m³ or less at a frequency of 300 kHz in each of Working Examples 1 to 4. In the magnetic core of Comparative example 2, the magnetic core loss increased so outstandingly that it was unable to make an accurate measurement under the same conditions, and therefore the mark "-" is given in Table 3. In the magnetic core of each Working Example, the radial crushing strength was 151 to 307 MPa, a strength far exceeding 120 MPa was achieved, and a specific resistance of 1×10³ Ω·m or more was achieved in each of the magnetic cores.

Figure 3:
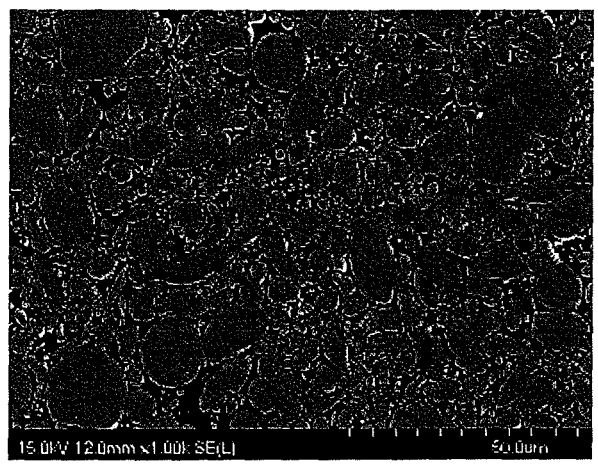
FIG. 3 is a SEM photograph of a cross-section of a magnetic core according to one example of the present invention (in the air, annealing temperature: 750° C.).
Figure 5:
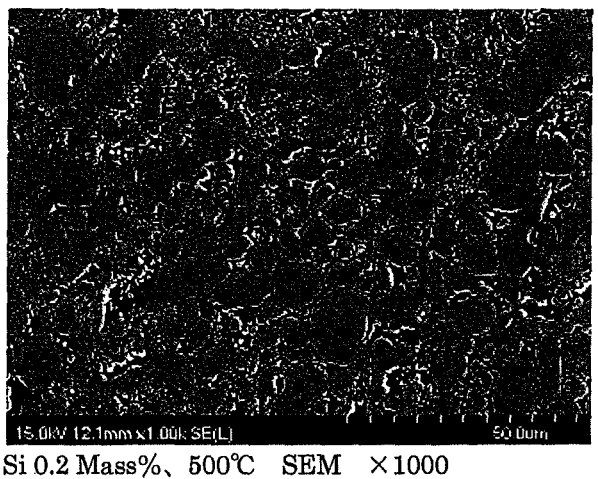
FIG. 5 is a SEM photograph of a cross-section of a magnetic core according to a comparative example (in the air, annealing temperature: 500° C.).
Figure 7:
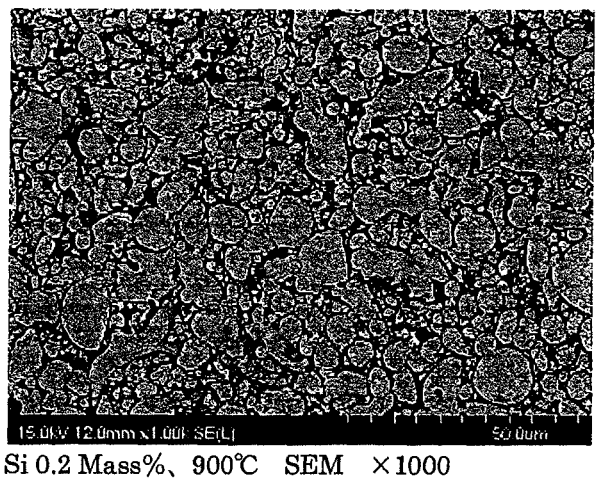
FIG. 7 is a SEM photograph of a cross-section of a magnetic core according to another comparative example (in the air, annealing temperature: 900° C.).

Cross-sections of these magnetic cores were observed, and distributions of the constituent elements were examined using a scanning electron microscope (SEM/EDX). FIG. 3 is a cross-section observation photograph in Working Example 3 (annealing temperature: 750° C.), FIG. 5 is a cross-section observation photograph in Comparative Example 1 (annealing temperature: 500° C.), and FIG. 7 is a cross-section observation photograph in Comparative Example 2 (annealing temperature: 900° C.). In the cross-section observation photograph, areas with a high brightness correspond to soft magnetic alloy particles, and areas with a low brightness correspond to grain boundary portions or gap portions.

In the magnetic core of Comparative Example 1 annealed at 500° C., the grain boundary between Fe-based soft magnetic alloy particles was thin, and gaps were observed in a region (triple-point part) surrounded by Fe-based soft magnetic alloy particles. When the annealing temperature was elevated to 750° C., the grain boundary between Fe-based soft magnetic alloy particles was slightly thickened (Working Example 3). Further, when the annealing temperature was elevated to 900° C., the thickness of the grain boundary between Fe-based soft magnetic alloy particles increased, and the number of neck portions with Fe-based soft magnetic alloy particles joined together so as to break the grain boundary increased (Comparative Example 2). It is considered that in the magnetic core of Comparative Example 2, a large number of neck portions were formed between Fe-based soft magnetic alloy particles to reduce the specific resistance, and the length of the eddy current path in the Fe-based soft magnetic alloy particle increased, so that the eddy current loss increased, leading to a considerable increase in magnetic core loss.

Figure 4:
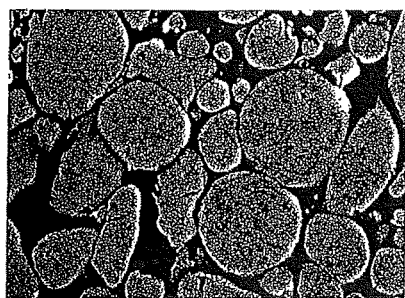
FIG. 4(*a*) is a SEM photograph of a cross-section of a magnetic core according to one example of the present invention (in the air, annealing temperature: 750° C.)
Figure 4:
Figure 4:
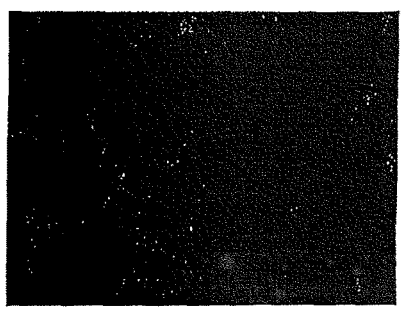
Figure 4:
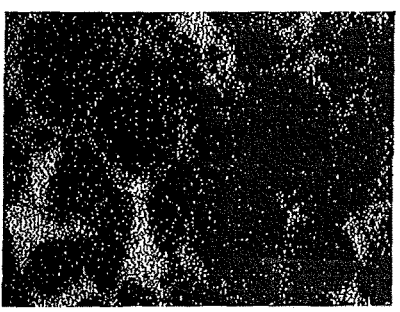
Figure 6:
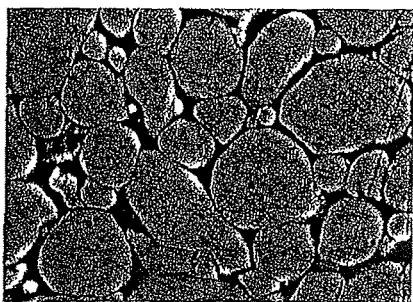
FIG. 6(*a*) is a SEM photograph of a cross-section of a magnetic core according to a comparative example (in the air, annealing temperature: 500° C.)
Figure 6:
Figure 6:
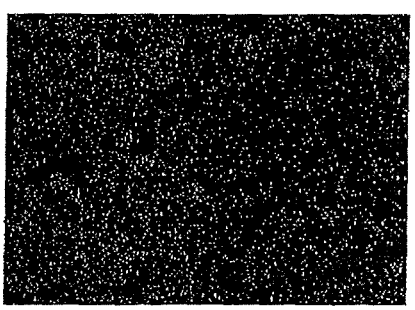
Figure 6:
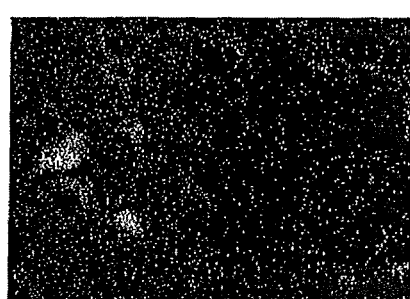
Figure 8:
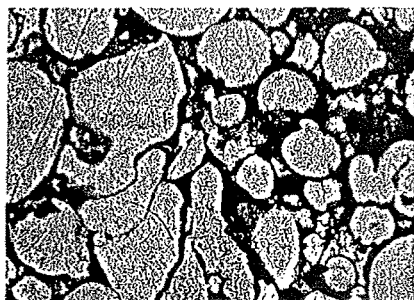
FIG. 8(*a*) is a SEM photograph of a cross-section of a magnetic core according to another comparative example (in the air, annealing temperature: 900° C.)
Figure 8:
Figure 8:
Figure 8:
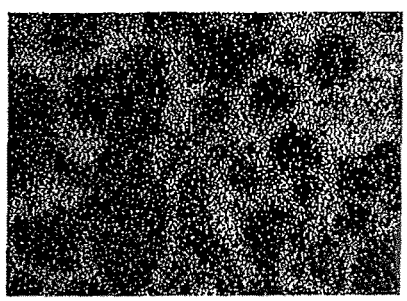
Figure 9:
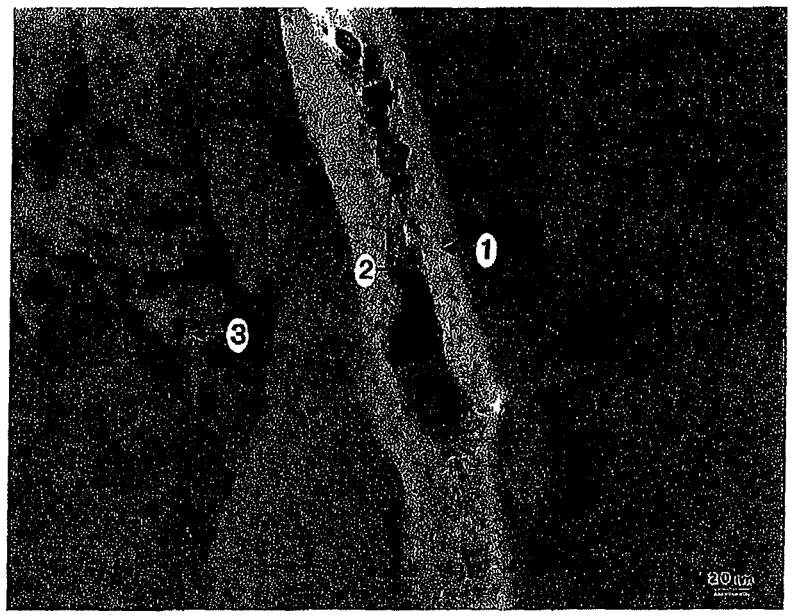
FIG. 9(*a*) shows a TEM photograph of a grain boundary in a cross-section of a magnetic core according to one example of the present invention (in the air, annealing temperature: 750° C.)
Figure 9:
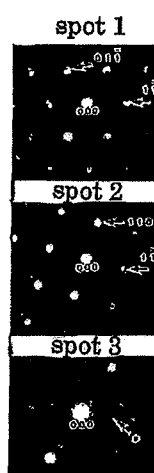
Figure 9:
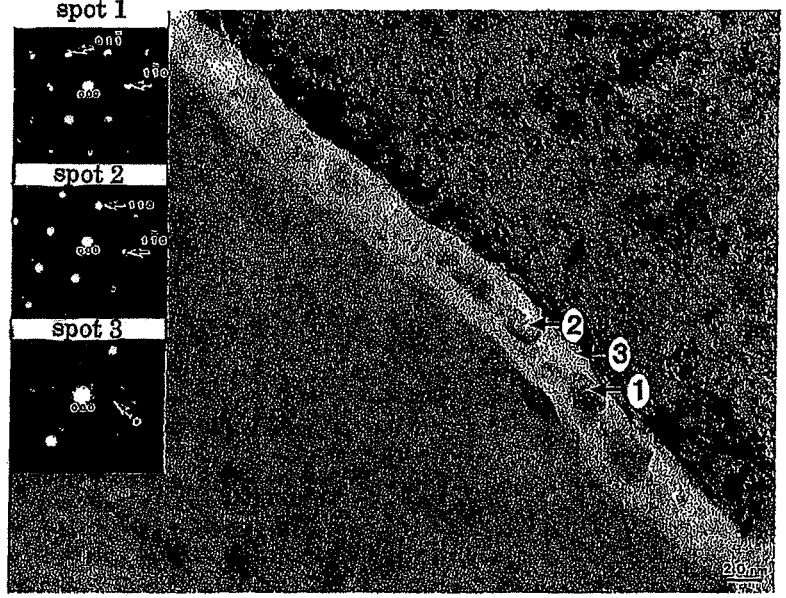

FIGS. 4, 6 and 8 each includes a SEM photograph of a cross-section of the magnetic core, and mapping diagrams showing distributions of elements in the corresponding field of view. FIGS. 4(a) to 4(d) are a SEM photograph, a mapping diagram showing a distribution of Fe, a mapping diagram showing a distribution of Al, and a mapping diagram showing a distribution of O, respectively, in Working Example 3 annealed at 750° C. FIGS. 6(a) to 6(d) are a SEM photograph, a mapping diagram showing a distribution of Fe, a mapping diagram showing a distribution of Al, and a mapping diagram showing a distribution of O, respectively, in Comparative Example 1 annealed at 500° C. FIGS. 8(a) to 8(d) are a SEM photograph, a mapping diagram showing a distribution of Fe, a mapping diagram showing a distribution of Al, and a mapping diagram showing a distribution of O, respectively, in Comparative Example 2 annealed at 900° C. For Si and Cr, mapping diagrams are omitted because these elements do not show a large concentration distribution over the range from the inside of the particle to the grain boundary.

In the mapping diagram, a brighter color tone indicates a larger number of target elements. In the magnetic core annealed at 750° C. (Working Example 3) and the magnetic core annealed at 900° C. (Comparative Example 2), the concentration of Al is high at the surface of the Fe-based soft magnetic alloy particle, and enrichment of Al at the grain boundary becomes more remarkable as the annealing temperature is elevated. It is shown that on the surface of the Fe-based soft magnetic alloy particle (grain boundary), there exists a large amount of O, so that oxides are formed, and the Fe-based soft magnetic material alloy particles are bonded together via layered oxides. On the other hand, the magnetic core annealed at 500° C. (Comparative Example 1) does not show remarkable enrichment of Al as in Working Example 3 and Comparative example 2.

Figure 10:
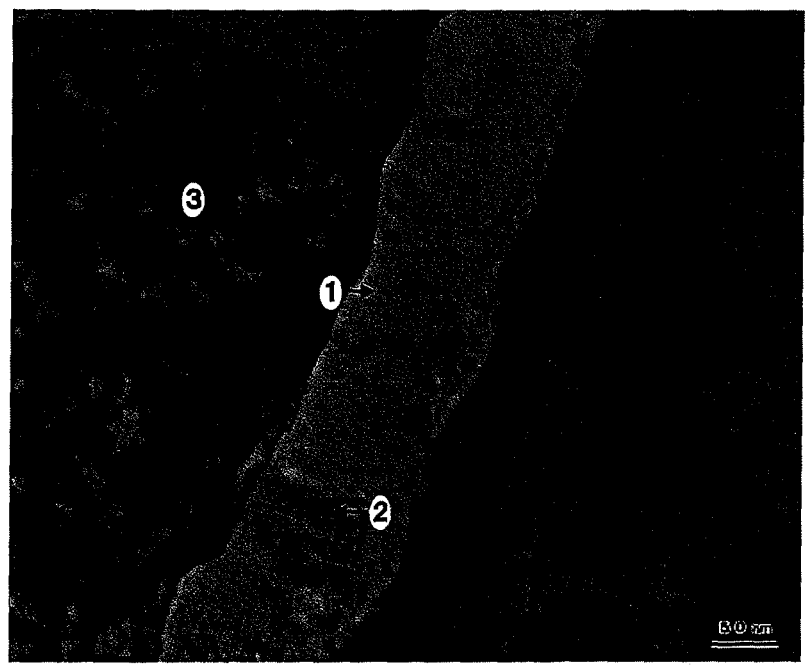
FIG. 10 is a TEM photograph of a grain boundary in a cross-section of a magnetic core according to one example of the present invention (in the air, annealing temperature: 900° C.).

FIG. 9(a) is a TEM photograph of a cross-section of the magnetic core annealed at 750° C. (Working Example 3). FIG. 10 is a TEM photograph of a cross-section of the magnetic core annealed at 900° C. (Comparative Example 2). In the TEM photograph, the belt-like area crossing in the vertical direction corresponds to the grain boundary, and areas which neighbor each other with the grain boundary interposed therebetween and have a brightness lower than that of the grain boundary correspond to Fe-based soft magnetic alloy particles. The average thickness of the grain boundary in the observation field of view was evaluated, and the result showed that the average thickness was 60 nm in Working Example 3, and 116.5 nm in Comparative Example 2. The thickness of the grain boundary from a TEM photograph of a cross-section of the magnetic core annealed at 600° C. (Working Example 1) was similarly evaluated, and the result showed that the average thickness was 38.0 nm (not illustrated).

In the magnetic core annealed at 750° C. (Working Example 3) as shown in FIG. 9(a), there is an area where the central part of the grain boundary (central part of oxide layer) and the vicinity of the Fe-based soft magnetic alloy particle have different color tones. Composition analysis was performed over a region with a diameter of 1 nm for a position in the vicinity of the Fe-based soft magnetic alloy particle and at a distance of about 5 nm from the surface of the alloy particle appearing as an outline of the cross-section (first point, marker 1), the central part of the grain boundary (second point, marker 2) and the inside of the alloy particle (marker 3). The results of quantitative analysis of the composition of the oxide layer at the grain boundary by TEM/EDX are shown in Table 4. Data which is not given a marker number corresponds to analysis results in other fields of view.

At the grain boundary, O was observed in addition to Fe, Al, Cr and Si which formed Fe-based soft magnetic alloy particles. Zn derived from zinc stearate added as a lubricant was also observed. In Working Example 1 and Working Example 3, the ratio of Al was higher than the ratio of each of Fe, Cr and Si to the sum of Fe, Cr, Al and Si at the first point (first region), and the ratio of Fe was higher than the ratio of each of Al, Cr and Si to the sum of Fe, Cr, Al and Si at the second point (second region).

In Working Examples 2 and 4, similarly to Working Examples 1 and 3, the ratio of Al was higher than the ratio of each of Fe, Cr and Si to the sum of Fe, Cr, Al and Si at the first point (first region), and the ratio of Fe was higher than the ratio of each of Al, Cr and Si to the sum of Fe, Cr, Al and Si at the second point (second region), although not shown in Table 4. On the other hand, in Comparative Example 2, the ratio of Al was higher than the ratio of each of Fe, Cr and Si to the sum of Fe, Cr, Al and Si irrespective of the analysis position at the grain boundary as shown in FIG. 10 and Table 4. It is considered that such a difference in configuration related to the oxide layer influences the specific resistance.

FIG. 9(b) is a TEM photograph, in another field of view, of a cross-section of the magnetic core annealed at 750° C. (Working Example 3), where a NBD pattern is shown on the left side. There is an area where the central part of the grain boundary (central part of oxide layer) and the vicinity of the Fe-based soft magnetic alloy particle have different color tones. Composition analysis was performed over a region with a diameter of 1 nm and the crystal structure was identified by nanobeam diffraction for the first point (marker 3) in the vicinity of the Fe-based soft magnetic alloy particle and in the vicinity of the surface of the alloy particle appearing as an outline of the cross-section, and the second points (markers 1 and 2) at the central part of the grain boundary. The region for nanobeam diffraction had a diameter of 1 nm to 3 nm. The results of quantitative analysis of the composition of the oxide layer at the grain boundary by TEM/EDX and identification of the crystal structure are shown in Table 5.

TABLE 4

| | Annealing temperature (° C.) | Position | Fe (% by mass) | Al (% by mass) | Cr (% by mass) | Si (% by mass) | Zn (% by mass) | O (% by mass) |
|---|---|---|---|---|---|---|---|---|
| Working Example 1 | 600 | First point | 6.8 | 51.2 | 6.4 | 0.9 | 0.0 | 34.7 |
| | | Second point | 51.8 | 22.0 | 1.5 | 0.3 | 1.0 | 23.4 |
| | | Inside of alloy particles | 90.1 | 3.9 | 3.5 | 0.3 | 0.0 | 2.2 |
| Working Example 3 | 750 | First point | 6.9 | 56.8 | 1.8 | 0.9 | 0 | 33.6 |
| | | Inside of alloy particles | 90.7 | 4.2 | 4.0 | 0.3 | 0 | 0.8 |
| | | First point (marker 1) | 6.2 | 54.3 | 7.3 | 0.0 | 1.2 | 31.0 |
| | | Second point (marker 2) | 78.4 | 11.7 | 1.8 | 0.1 | 0.8 | 7.2 |
| | | Inside of alloy particles (marker 3) | 92.6 | 2.9 | 4.2 | 0.3 | 0.0 | 0.0 |
| Comparative Example 2 | 900 | First point (marker 1) | 3.4 | 53.2 | 5.7 | 2.6 | 0.0 | 35.1 |
| | | Second point (marker 2) | 2.1 | 59.1 | 0.9 | 0.4 | 0.0 | 37.5 |
| | | Inside of alloy particles (marker 3) | 94.2 | 2.1 | 3.2 | 0.3 | 0.0 | 0.2 |

TABLE 5

| | Position | Fe (% by mass) | Al (% by mass) | Cr (% by mass) | Si (% by mass) | Zn (% by mass) | O (% by mass) | Crystal structure |
|---|---|---|---|---|---|---|---|---|
| Working Example 3 | First point (marker 3) | 6.8 | 60.7 | 1.6 | 0.3 | 0.8 | 29.8 | May be amorphous |
| | Second point (marker 1) | 64.2 | 19.6 | 4.1 | 0.1 | 1.7 | 10.3 | Can be indexed with Fe(bcc) |
| | Second point (marker 2) | 65.4 | 17.5 | 3.4 | 0.0 | 1.5 | 12.2 | Can be indexed with Fe(bcc) |

At the grain boundary, Fe, Al, Cr, Si and O were observed. Zn derived from zinc stearate added as a lubricant was also observed. At the first point, the ratio of Al was higher than the ratio of each of Fe, Cr and Si to the sum of Fe, Cr, Al and Si (first region). At the second point, the ratio of Fe was higher than the ratio of each of Al, Cr and Si to the sum of Fe, Cr, Al and Si (second region). The grain boundary shown in FIG. 9(b) includes an area where the second region is surrounded by the first region, and the second region is formed in an island shape.

Further, the diffraction pattern showed that the structure was in an amorphous form at the first point (NBD pattern/spot 3). At a marker portion, a pattern supposed to be a hollow ring was observed, and other spots were also observed. The reason why the structure is in an amorphous form is that whether the structure is not sufficiently crystallized, and includes fine crystal grains, or the structure is completely amorphous, but other spots are observed due to influences of a region existing in the thickness direction of the analysis sample cannot be determined. On the other hand, the second point (NBD pattern/spots 1, 2) can be indexed with Fe (bcc), and is thus considered to be metal. Thus, the first point and the second point have definitely different crystal structures, and the second region in which the ratio of Fe is higher than the ratio of each of Al, Cr and Si to the sum of Fe, Cr, Al and Si may include a part which is considered to be Fe (bcc).

Figure 11:
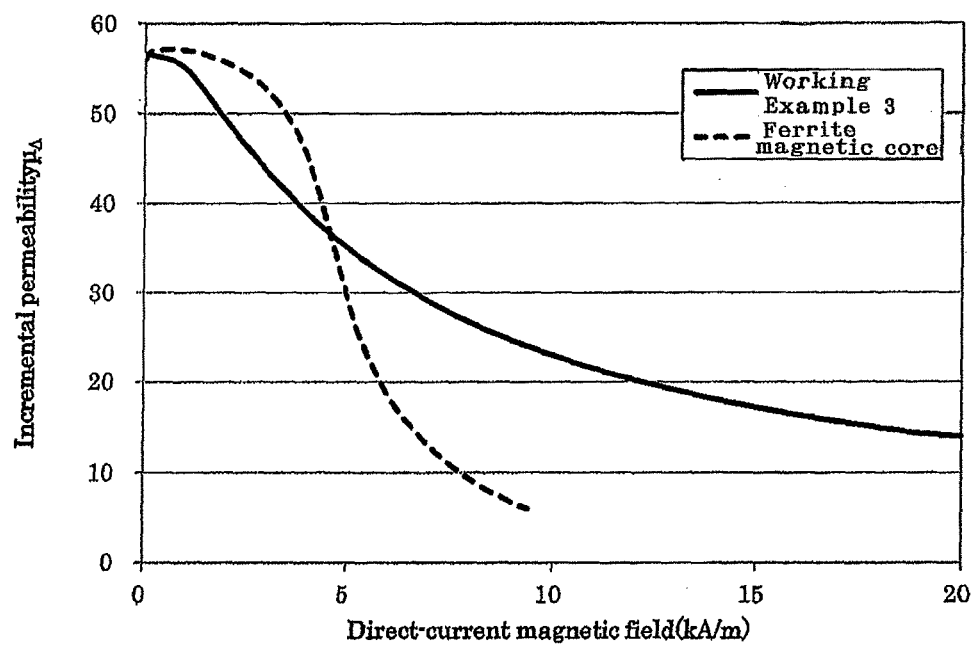
FIG. 11 is a graph showing a direct-current superimposing characteristic of a coil component using a magnetic core according to one example of the present invention (in the air, annealing temperature: 750° C.).

Direct-current superimposing characteristics were compared using the magnetic core of Working Example 3 and a ferrite magnetic core. A relationship between an inductance and a direct-current superimposing current is shown in FIG. 11. The ferrite magnetic core is one in which a ring magnetic core using a Ni-based ferrite (material name: NL30S) manufactured by Hitachi Metals, Ltd. and having external dimensions of an inner diameter ϕ of 8 mm, an outer diameter ϕ of 14 mm and a thickness of 5 mm is divided into two equal parts, with a 0.5 mm magnetic gap provided at each of two locations in a magnetic path. The magnetic core of Working Example 3 is not provided with a gap. The magnetic core of Working Example 3, in which a reduction in inductance was suppressed at a large direct-current superimposing current, was superior in direct-current superimposing characteristic as compared to the ferrite magnetic core.

Comparative Example 3

A magnetic core was prepared with annealing performed in a $N_2$ atmosphere. For the magnetic core, Fe-based soft magnetic alloy particles of alloy No. 1 (Fe-4.92Al-3.89Cr-0.20Si) in Table 1 were used. Alloy particles were formed by the granulation method 1, then filled into a die, and pressed at a pressure of 0.74 GPa. Further, the compact was heat-treated in a $N_2$ atmosphere at an annealing temperature of 750° C. with a holding time of 1 hour to obtain a magnetic core. The characteristics, such as the specific resistance and the radial crushing strength, of the obtained magnetic core were evaluated, and structure observation, and composition analysis of the oxide layer were performed by SEM and TEM. The results are shown in Tables 6 to 8 and FIGS. 12 and 13. In the tables, the incremental permeability $\mu_A$ are values when a direct-current magnetic field of 1000 A/m is applied. The same applies to the subsequent evaluations.

TABLE 6

| | Annealing atmosphere | Annealing temperature (° C.) | Compact density dg × 10³ (kg/m³) | Density after annealing dg × 10³ (kg/m³) | Space factor (%) | Specific resistance × 10³ Ω · m at 50 V | Radial crushing strength (MPa) |
|---|---|---|---|---|---|---|---|
| Comparative Example 3 | $N_2$ | 750 | 6.05 | 6.08 | 83.6 | Short-circuit | 102 |

TABLE 7

|  | Magnetic core loss (kW/m³) | | | Initial permeability μI | Incremental permeability μ_A | Abundance ratio of alloy particles having a maximum diameter of 40 μm or more (%) | Average of maximum diameters (μm) | Average thickness of oxide layer (nm) |
| --- | --- | --- | --- | --- | --- | --- | --- | --- |
|  | 50 kHz | 300 kHz | 500 kHz | | | | | |
| Comparative Example 3 | 119 | 1386 | 3807 | 54.9 | 22.8 | 0 | 17 | 24.2 |

The magnetic core annealed in a $N_2$ atmosphere (Comparative Example 3) has a low radial crushing strength of 102 MPa, a specific resistance corresponding to a short-circuit state, and a magnetic core loss far exceeding 750 kW/m³ at a frequency of 300 kHz.

Figure 12:
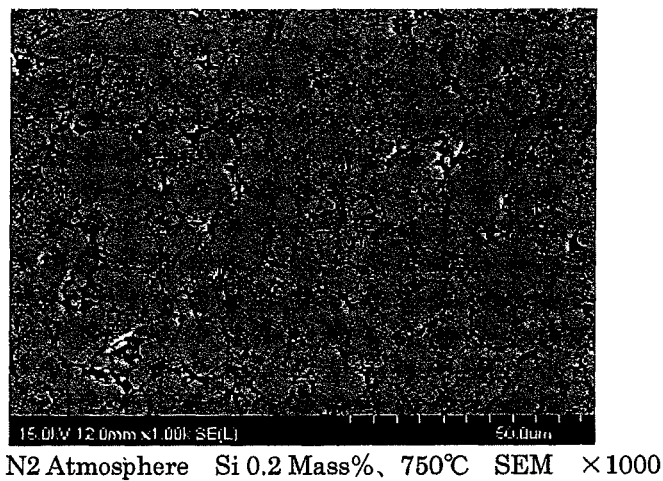
FIG. 12 is a SEM photograph of a cross-section of a magnetic core according to another comparative example (in $N_2$, annealing temperature: 750° C.).

A cross-section of the magnetic core was observed, and distributions of constituent elements were examined using a scanning electron microscope (SEM/EDX). FIG. 12 is a cross-section observation photograph in Comparative Example 3 ($N_2$ atmosphere).

Figure 13:
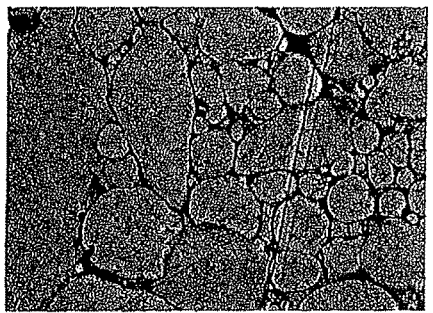
FIG. 13(a) is a SEM photograph of a cross-section of a magnetic core according to another comparative example (in $N_2$, annealing temperature: 750° C.)
FIG. 13(b) is a mapping diagram showing a distribution of Fe in the cross-section of the magnetic core.
FIG. 13(c) is a mapping diagram showing a distribution of Al in the cross-section of the magnetic core.
FIG. 13(d) is a mapping diagram showing a distribution of O in the cross-section of the magnetic core.
Figure 13:
Figure 13:
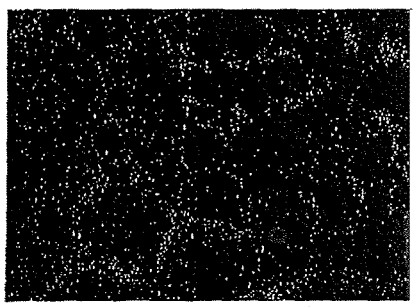
Figure 13:
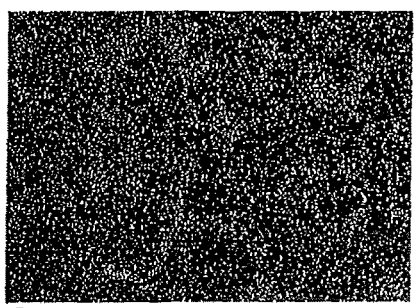

FIG. 13 includes a SEM photograph of a cross-section of the magnetic core, and mapping diagrams showing distributions of elements in the corresponding field of view. FIGS. 13(a) to 13(d) are a SEM photograph, a mapping diagram showing a distribution of Fe, a mapping diagram showing a distribution of Al, and a mapping diagram showing a distribution of O, respectively, in Comparative Example 3 annealed in a $N_2$ atmosphere.

In the magnetic core of Comparative Example 3 annealed in a $N_2$ atmosphere, the concentration of Al is high at the surface of the Fe-based soft magnetic alloy particle. At the surface of the Fe-based soft magnetic alloy particle (grain boundary), there existed a large amount of O, so that oxides were formed. The origin of the O may be O in the binder, O contained in a $N_2$ gas in a very small amount, O as an impurity in the alloy, or the like.

Figure 14:
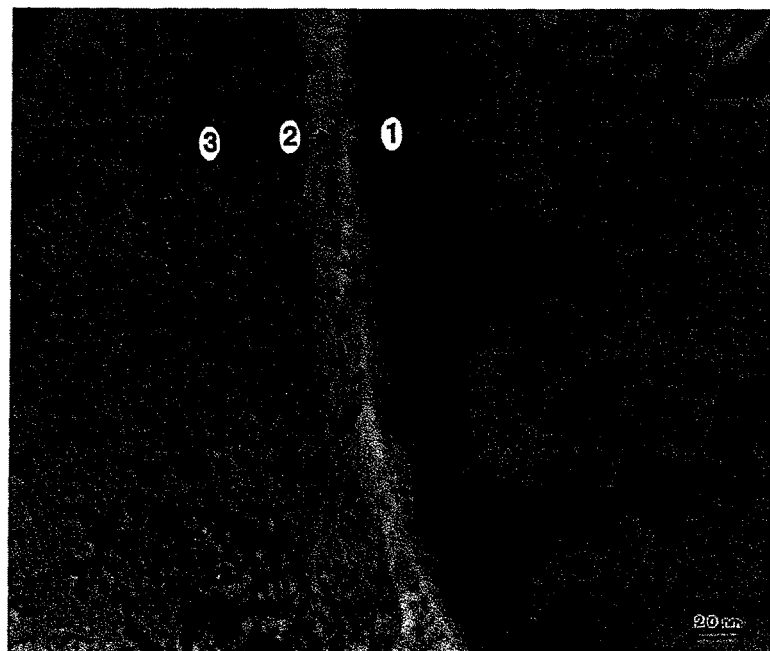
FIG. 14 is a TEM photograph of a grain boundary of a cross-section of a magnetic core according to another comparative example (in $N_2$, annealing temperature: 750° C.).

FIG. 14 is a TEM photograph of a cross-section of the magnetic core annealed in an $N_2$ atmosphere (Comparative Example 3). In the TEM photograph, the belt-like area crossing in the vertical direction corresponds to the grain boundary, and areas which neighbor each other with the grain boundary interposed therebetween and have a brightness lower than that of the grain boundary correspond to Fe-based soft magnetic alloy particles. The interface between the grain boundary (oxide layer thereof) and the alloy particle was unclear. The average thickness of the grain boundary in the observation field of view was about 24.2 nm. The results of performing quantitative analysis of the composition for the first point and the second point in the manner described above are shown in Table 8.

TABLE 8

| | Position | Fe (% by mass) | Al (% by mass) | Cr (% by mass) | Si (% by mass) | Zn (% by mass) | O (% by mass) | N (% by mass) |
| --- | --- | --- | --- | --- | --- | --- | --- | --- |
| Comparative Example 3 | First point (marker 1) | 54.4 | 29.4 | 1.6 | 0.8 | 0.0 | 9.2 | 4.6 |
| | Second point (marker 2) | 16.7 | 55.2 | 1.3 | 0.5 | 0.0 | 18.3 | 8.0 |
| | Inside of alloy particles (marker 3) | 92.0 | 3.7 | 3.9 | 0.2 | 0.0 | 0.2 | 0 |

Fe, Al, Cr, Si, O and N were observed at the grain boundary. At the first point, the ratio of Fe is higher than the ratio of each of Al, Cr and Si to the sum of Fe, Cr, Al and Si. And, at the second point, the ratio of Al is higher than the ratio of each of Fe, Cr and Si to the sum of Fe, Cr, Al and Si. Thus, the composition distribution in Comparative Example 3 is different from the composition distributions in Working Examples 1 and 3. It is considered that such a difference in configuration influences a difference in specific resistance and radial crushing strength.

Working Examples 5 to 9

Magnetic cores having different composition amounts of Si in Fe-based soft magnetic alloy particles were prepared. For the magnetic cores, Fe-based soft magnetic alloy particles of alloys Nos. 2 to 6 in Table 1 were used. Alloy particles were formed by the granulation method 1, then filled into a die, pressed at a pressure of 0.74 GPa, and heat-treated in the air at an annealing temperature of 750° C. with a holding time of 1 hour to obtain a magnetic core. The characteristics, such as the specific resistance and the radial crushing strength, of the obtained magnetic core were evaluated. The results are shown in Tables 9 and 10.

TABLE 9

| | Alloy No. | Amount of Si (% by mass) | Compact density dg × 10³ (kg/m³) | Density after annealing dg × 10³ (kg/m³) | Space factor (%) | Specific resistance × 10³ Ω · m at 50 V | Radial crushing strength (MPa) |
|---|---|---|---|---|---|---|---|
| Working Example 5 | 2 | 0.11 | 6.21 | 6.45 | 88.6 | 14.0 | 244 |
| Working Example 3 | 1 | 0.20 | 6.07 | 6.36 | 87.4 | 11.0 | 287 |
| Working Example 6 | 3 | 0.30 | 6.20 | 6.37 | 87.6 | 19.0 | 217 |
| Working Example 7 | 4 | 0.47 | Not-measured | 6.36 | 87.5 | 7.0 | 219 |
| Working Example 8 | 5 | 0.53 | Not-measured | 6.36 | 87.5 | 6.1 | 237 |
| Working Example 9 | 6 | 0.94 | Not-measured | 6.30 | 86.6 | 2.5 | 204 |

TABLE 10

| | Magnetic core loss (kW/m³) | | | Initial permeability μl | Incremental permeability μ_Δ | Abundance ratio of alloy particles having maximum diameter of 40 μm or more (%) | Average of maximum diameters (μm) | Average thickness of oxide layer (nm) |
|---|---|---|---|---|---|---|---|---|
| | 50 kHz | 300 kHz | 500 kHz | | | | | |
| Walking Example 5 | 64 | 432 | 774 | 54.5 | 22.9 | 0 | 18 | Not-evaluated |
| Working Example 3 | 69 | 478 | 830 | 56.7 | 22.9 | 0 | 17 | 60.0 |
| Working Example 6 | 62 | 422 | 755 | 61.5 | 2.0 | 0 | 19 | Not-evaluated |
| Working Example 7 | 61 | 412 | 727 | 57.9 | 24.1 | 0 | 17 | Not-evaluated |
| Working Example 8 | 60 | 418 | 737 | 55.5 | 23.2 | 0 | 17 | Not-evaluated |
| Working Example 9 | 48 | 334 | 603 | 62.2 | 23.7 | 0 | 16 | 42.0 |

When the amount of Si in the Fe-based soft magnetic alloy increased, the specific resistance and the radial crushing strength decreased, but in the magnetic core of each Working Example, a high specific resistance, and a strength far exceeding 120 MPa were achieved.

Cross-sections of the magnetic cores were observed, and distributions of the constituent elements were examined using a scanning electron microscope (SEM/EDX). There was no remarkable difference in enrichment of Al depending on a difference in the amount of Si.

Figure 15:
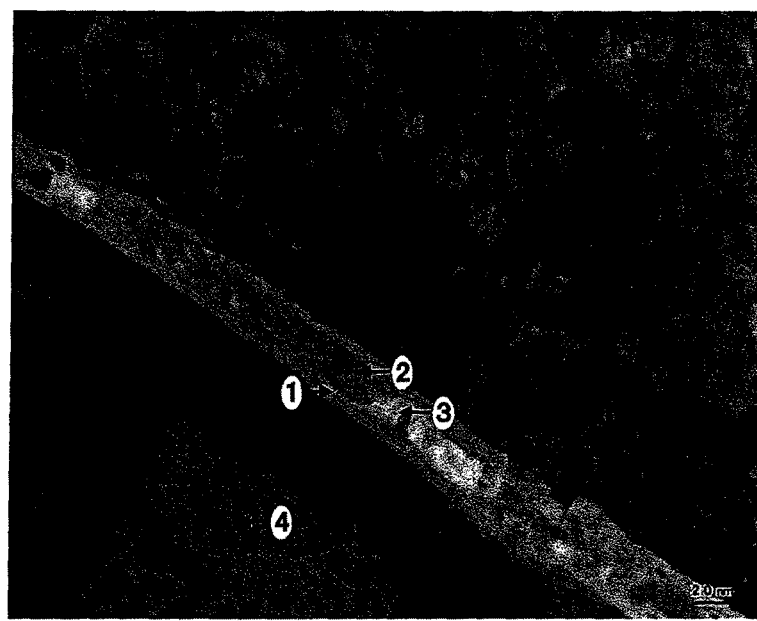
FIG. 15 is a TEM photograph of a grain boundary of a cross-section of a magnetic core according to another example (in the air, Si: 0.94% by mass, annealing temperature: 750° C.).

FIG. 15 is a TEM photograph of a cross-section of the magnetic core in which the amount of Si is 0.94% by mass (Working Example 9). The belt-like area corresponds to the grain boundary, and areas which neighbor each other with the grain boundary interposed therebetween and have a brightness lower than that of the grain boundary correspond to Fe-based soft magnetic alloy particles. The results of performing composition analysis for the first point (marker 1) and the second points (marker 2 and marker 3) at the grain boundary and the inside of the alloy particle (marker 4) in the manner described above are shown in Table 11.

TABLE 11

| | Position | Fe (% by mass) | Al (% by mass) | Cr (% by mass) | Si (% by mass) | Zn (% by mass) | O (% by mass) |
|---|---|---|---|---|---|---|---|
| Working Example 9 | First point (marker 1) | 12.4 | 48.7 | 4.3 | 0.8 | 0.9 | 32.9 |
| | Second point (marker 2) | 77.8 | 12.5 | 3.7 | 0.4 | 0 | 5.6 |
| | Second point (marker 3) | 48.1 | 22.5 | 14.4 | 0.5 | 0 | 14.5 |
| | Inside of alloy particles (marker 4) | 90.8 | 2.8 | 4.4 | 1.0 | 0 | 1.0 |

The magnetic core of Working Example 9 (the amount of Si in alloy particle: 0.94% by mass) had an area where Cr was enriched as compared to other examples at the central part (central part of oxide layer) of the grain boundary. In composition analysis in Working Examples 5 to 8, a first region and a second region similar to those in Working Examples 1 and 3 were observed in the oxide layer (not shown in Table 11).

Working Examples 10 and 11

Magnetic cores having different composition amounts of Cr and Al in Fe-based soft magnetic alloy particles were prepared. For the magnetic cores, Fe-based soft magnetic alloy particles of alloys Nos. 7 and 8 in Table 1 were used. Alloy particles were formed by the granulation method 1, then filled into a die, pressed at a pressure of 0.74 GPa, and heat-treated in the air at an annealing temperature of 750° C. with a holding time of 1 hour to obtain a magnetic core. The characteristics, such as the specific resistance and the radial crushing strength, of the obtained magnetic core were evaluated. The results are shown in Tables 12 and 13.

TABLE 12

| | Compact density dg × $10^3$ (kg/m$^3$) | Density after annealing dg × $10^3$ (kg/m$^3$) | Space factor (%) | Specific resistance × $10^3$ Ω·m at 50 V | Radial crushing strength (MPa) |
|---|---|---|---|---|---|
| Working Example 10 | 6.1 | 6.32 | 87.1 | 3 | 227 |
| Working Example 11 | Not-evaluated | 6.09 | 85.5 | 21.0 | 217 |

TABLE 13

| | Magnetic core loss (kW/m$^3$) | | | Initial permeability μi | Incremental permeability μ$_Δ$ | Abundance ratio of alloy particles having maximum diameter of 40 μm or more (%) | Average of maximum diameters (μm) |
|---|---|---|---|---|---|---|---|
| | 50 kHz | 300 kHz | 500 kHz | | | | |
| Working Example 10 | 80 | 522 | 917 | 57.4 | 21.9 | 0 | 21 |
| Working Example 11 | 53 | 357 | 647 | 61.5 | 22.5 | 0 | 22 |

In the magnetic core of Working Example 10 with the amount of Cr increased to 8% by mass, the specific resistance was lower than that of the magnetic core of Working Example 3, but a specific resistance of 1×10$^3$ Ω·cm or more and a strength far exceeding 120 MPa were achieved. In the magnetic core of Working Example 11 with the amount of Al increased to 8% by mass, the specific resistance was higher than that of the magnetic core of Working Example 3, and a strength far exceeding 120 MPa was achieved. A cross-section of the magnetic core was observed, and distributions of constituent elements were examined using a scanning electron microscope (SEM/EDX). In each of the magnetic cores, the concentration of Al was high at the surface of the Fe-based soft magnetic alloy particle, and on the surface of the Fe-based soft magnetic alloy particle (grain boundary), there existed a large amount of O, so that oxides were formed. In composition analysis of these magnetic cores, a first region and a second region similar to those in Working Examples 1 and 3 were observed on the oxide layer.

Reference Example 1

Fe-based soft magnetic alloy particles having an oxide film deposited on the surfaces thereof were formed by a heat treatment in which a compact was held at 900° C. for 1 hour in an electric furnace, and a magnetic core was prepared using the Fe-based soft magnetic alloy particles. The heat-treated Fe-based soft magnetic alloy particles were solidified in the form of a bulk, and was required to be crushed before a pressing step. For the magnetic core, Fe-based soft magnetic alloy particles of alloy No. 9 (Fe-4.92Al-3.89Cr-0.20Si) in Table 1 were used. Alloy particles were formed by the granulation method 1, then filled into a die, pressed at a pressure of 0.74 GPa, and heat-treated in the air at an annealing temperature of 750° C. with a holding time of 1 hour to obtain a magnetic core. The characteristics, such as the specific resistance and the radial crushing strength, of the obtained magnetic core were evaluated. The results are shown in Tables 14 and 15.

TABLE 14

| | Compact density dg × $10^3$ (kg/m$^3$) | Density after annealing dg × $10^3$ (kg/m$^3$) | Space factor (%) | Specific resistance × $10^3$ Ω·m at 50 V | Radial crushing strength (MPa) |
|---|---|---|---|---|---|
| Reference Example 1 | 4.11 | 4.08 | 56.1 | Not-evaluated | Not-evaluated |

TABLE 13

| | Magnetic core loss (kW/m$^3$) | | | Initial permeability μi | Incremental permeability μ$_Δ$ |
|---|---|---|---|---|---|
| | 50 kHz | 300 kHz | 500 kHz | | |
| Reference Example 1 | — | — | — | 2.9 | 2.9 |

In the Fe-based soft magnetic alloy particles heat-treated beforehand, the compact density did not increase with a pressure of 0.74 MPa, and therefore the initial permeability considerably decreased. The magnetic core loss was so poor that it was unable to make a measurement under the same conditions as in Working Example 3. Further, the density was substantially unchanged before and after annealing, suggesting that unlike the present invention, the oxide layer was not self-generated from Fe-based soft magnetic alloy particles by annealing. The strength of the magnetic core after annealing was so poor that cracking and chipping occurred under stress at the time of winding a wire in measurement of the initial permeability. The magnetic core after annealing had a space factor of less than 60%, and was not practically usable.

Reference Example 2

Figure 16:
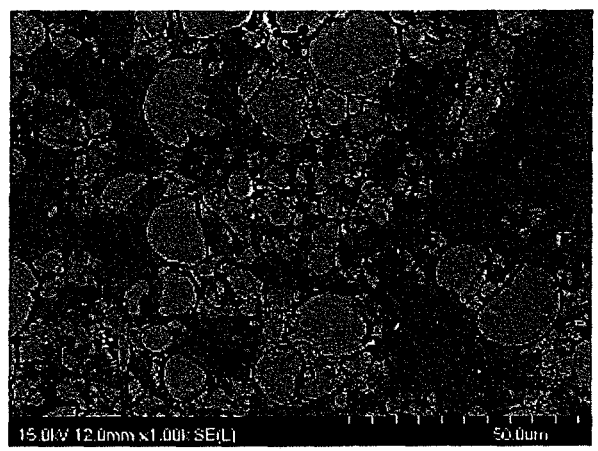
FIG. 16 is a SEM photograph of a cross-section of a magnetic core according to a reference example.

A magnetic core was prepared by subjecting Fe-based soft magnetic alloy particles of alloy No. 9 to discharge plasma sintering shown in Patent Document 4. Fe-based soft magnetic alloy particles were heat-treated and crushed, and then filled into a graphite die without adding a binder, the graphite die was then placed in a chamber, and discharge plasma sintering was performed under the condition of a pressure of 50 MPa, a heating temperature of 900° C. and a holding time of 5 minutes. FIG. 16 is a TEM photograph of a cross-section of the magnetic core prepared by performing discharge plasma sintering. The obtained magnetic core includes Fe-based soft magnetic alloy particles looking bright and a Fe oxide filling gaps between Fe-based soft magnetic alloy particles and looking relatively dark in the figure. However, the magnetic core is mainly composed of a Fe oxide which does not have magnetism, and therefore the magnetic core is extremely poor in performance as a magnetic material. Further, it has been found that this production method not only has complicated production steps, but also cannot be directly applied when a fine atomized powder is used.

Comparative Example 4

A magnetic core was prepared using Fe—Cr—Si-based soft magnetic alloy particles containing 4.5% by mass of Cr and 3.5% by mass of Si with the balance being constituted by Fe. For the alloy particles, PF-20F manufactured by Epson Atmix Corporation was used. Alloy particles were formed by the granulation method 1, then filled into a die, pressed at a pressure of 0.91 GPa, and heat-treated in the air at an annealing temperature of 700° C. with a holding time of 1 hour to obtain a magnetic core. The characteristics, such as the specific resistance and the radial crushing strength, of the obtained magnetic core were evaluated. The results are shown in Tables 16 and 17.

TABLE 16

| | Compact density $dg \times 10^3$ $(kg/m^3)$ | Density after annealing $dg \times 10^3$ $(kg/m^3)$ | Space factor (%) | Specific resistance × $10^3 \Omega \cdot m$ at 50 V | Radial crushing strength (MPa) |
|---|---|---|---|---|---|
| Comparative Example 4 | Not-evaluated | 6.10 | 82.0 | 0.46 | 75 |

TABLE 17

| | Magnetic core loss $(kW/m^3)$ | | | Initial permeability $\mu_i$ | Incremental permeability $\mu_\Delta$ |
|---|---|---|---|---|---|
| | 50 kHz | 300 kHz | 500 kHz | | |
| Comparative Example 4 | 82.4 | 536.0 | 943.0 | 35.0 | 23.3 |

A cross-section of the magnetic core was observed, and distributions of the constituent elements were examined using a scanning electron microscope (SEM/EDX). The concentration of Cr is high at the surface of the Fe-based soft magnetic alloy particle, and on the surface of the Fe-based soft magnetic alloy particle (grain boundary), there existed a large amount of O, so that oxides were formed. The magnetic core had a low specific resistance, and a radial crushing strength comparable to that of a ferrite magnetic core.

For the magnetic cores of Working Example 3 and Comparative Example 4, corrosion resistance was evaluated by conducting a salt water spray test at a temperature of 35° C. using a 5% aqueous NaCl solution in accordance with JIS Z2371 (2000). In a state after elapse of 24 hours, the magnetic core of Working Example 3 exhibited more satisfactory corrosion resistance as compared to the magnetic core of Comparative Example 4, and was excellent in rust prevention without getting rusty. On the other hand, the magnetic core of Comparative Example 4 was significantly corroded, and was insufficient in corrosion resistance.

Working Example 12

Figure 17:
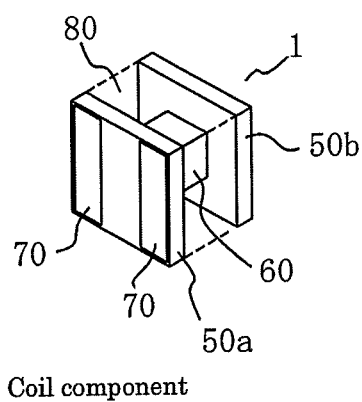
FIG. 17 is an outline perspective view showing one example of a coil component according to the present invention.

FIG. 17 is an outline perspective view of a coil component using an angular flange-shaped magnetic core. A magnetic core 1 includes one barrel portion 60 between a pair of flange portions 50a and 50b. The magnetic core 1 is prepared using the same alloy and production method as in Working Example 2 except that it has the above-mentioned shape. Two terminal electrodes 70 are formed on one surface of one flange portion 50a. The magnetic core 1 has a high specific resistance of $11 \times 10^3$ Ω·m, and a silver conductive paste is applied directly to a surface of the magnetic core 1, and baked to form the terminal electrode 70. A winding wire 80 formed by winding an enamel conductor is placed around the barrel portion 60, but it is not illustrated. Both ends of the winding wire 80 were connected, respectively, to the terminal electrodes 70 by thermocompression bonding to obtain a surface-mounting-type coil component such as a choke coil. In the surface-mounting-type coil component of this example, a surface of the flange portion provided with the terminal electrodes 70 is a mounting surface to a circuit board.

The magnetic core has a high specific resistance as described above, and therefore even when a resin case for insulation (also called a bobbin) is not used, a conductor can be directly laid in the magnetic core, and terminal electrodes 70 for connecting a winding wire can be formed on a surface of the magnetic core. Accordingly, the coil component had a reduced size. Further, the mounting height of the coil component was kept small, and stable mountability was obtained. Even if an external force acts on the flange portion 50a or 50b or the barrel portion 60 at the time of winding a conductor around the barrel portion 60 of the magnetic core, the coil component is not easily broken because the magnetic core 1 has a high strength.

DESCRIPTION OF REFERENCE SINGS

1 Magnetic core
20 Fe-based soft magnetic alloy particle
30 Oxide layer
30a First region of oxide layer
30b Second region of oxide layer

The invention claimed is:
1. A magnetic core having a structure in which Fe-based soft magnetic alloy particles are connected via a grain boundary, wherein
the Fe-based soft magnetic alloy particle contains Al, Cr and Si, and an oxide layer containing at least Fe, Al, Cr and Si is formed at the grain boundary that connects the neighboring Fe-based soft magnetic alloy particles,
the oxide layer contains an amount of Al larger than that in Fe-based soft magnetic alloy particles in terms of a mass ratio, and includes a first region in which the ratio of Al is higher than the ratio of each of Fe, Cr and Si to the sum of Fe, Cr, Al and Si, and a second region in which the ratio of Fe is higher than the ratio of each of Al, Cr and Si to the sum of Fe, Cr, Al and Si, and
the first region is situated on the Fe-based soft magnetic alloy particle side.
2. The magnetic core according to claim 1, wherein the grain boundary includes an area where the second region is sandwiched by the first region, or the second region is surrounded by the first region.
3. The magnetic core according to claim 1, wherein the space factor of the magnetic core is 80 to 90%.

4. The magnetic core according to claim 1, wherein the Fe-based soft magnetic alloy particle contains Al in an amount of not less than 3% by mass and not more than 10% by mass, Cr in an amount of not less than 3% by mass and not more than 10% by mass, and Si in an amount of not less than 0.05% by mass and not more than 1% by mass.

5. A coil component with a wire wound around the magnetic core according to claim 1.

* * * * *